(12) United States Patent  
Sawai

(10) Patent No.: US 6,451,622 B1
(45) Date of Patent: Sep. 17, 2002

(54) OPTICAL DEVICE

(75) Inventor: Akiyoshi Sawai, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/558,331

(22) Filed: Apr. 26, 2000

(30) Foreign Application Priority Data

Oct. 6, 1999 (JP) ............................................. 11-285794

(51) Int. Cl.$^7$ ................................................ H01L 21/00
(52) U.S. Cl. ............................. 438/65; 438/27; 438/63; 365/76; 365/83; 365/88; 257/98; 257/66
(58) Field of Search ...................... 438/65, 123, 25–27, 438/51; 257/98–100, 664–666; 385/76–94

(56) References Cited

U.S. PATENT DOCUMENTS

| | | | | |
|---|---|---|---|---|
| 4,410,469 A | * | 10/1983 | Katagiri et al. | 264/1.5 |
| 4,988,159 A | * | 1/1991 | Turner et al. | 350/96.2 |
| 5,013,495 A | * | 5/1991 | Noba et al. | 264/1.5 |
| 5,608,829 A | * | 3/1997 | Oda et al. | 385/76 |
| 5,737,467 A | * | 4/1998 | Kato et al. | 385/92 |
| 6,092,935 A | * | 7/2000 | Althaus et al. | 385/93 |
| 6,170,996 B1 | * | 1/2001 | Miura et al. | 385/94 |
| 6,263,137 B1 | | 7/2001 | Yoneyama et al. | |
| 6,293,711 B1 | | 9/2001 | Sasaki | |
| 6,296,789 B1 | | 10/2001 | Go et al. | |

FOREIGN PATENT DOCUMENTS

| | | |
|---|---|---|
| JP | 10-227952 | 8/1998 |
| JP | 11-237532 | 8/1999 |
| JP | 11-264920 | 9/1999 |

OTHER PUBLICATIONS

Sunaga et al. "2 Gbits small form factor fiber–optic transceiver for single mode optical fiber" IEEE Transactions on Advanced Packaging vol. 23 No. 2 6/99 pp. 176–181.*

Oikawa et al. "Packaging technology for a 1–gbs photoreceiver module" IEEE Journal of lightwave technology vol. 12 No. 2 2/94 pp. 343–352.*

Terashima et al. "Plastic–package–type optoelectronic transmitter module using resinous sealing" OFC 1998 technical digest (WM15) pp. 193–194.*

"Surface Mountable Pin–PD Module for Analog Transmission Systems", Annual Conference of IEICE, 1997, Japan.

"Surface Mount Type LD Module Using Transfer Molding", Annual Conference of IEICE, 1997, Japan.

* cited by examiner

*Primary Examiner*—Matthew Smith
*Assistant Examiner*—Granvill D Lee
(74) *Attorney, Agent, or Firm*—Leydig, Voit & Mayer, Ltd.

(57) ABSTRACT

An optical device and a method for manufacturing the optical device. An optical device having a molded-package structure includes: a lead frame having a ferrule-mounting portion; a ferrule mounted on the ferrule-mounting portion; and a molding resin that encapsulates the lead frame and the ferrule, molding, except that an end of the ferrule protrudes through and outside of the surface of the molding resin. The first groove parallel to a longitudinal axis of the ferrule is located on the ferrule-mounting portion and the ferrule is placed on the first groove. Thus, the ferrule is hardly ever detached from a ferrule-mounting portion, an optical fiber is hardly ever damaged, and an optical coupling is hardly ever obstructed.

16 Claims, 17 Drawing Sheets

OPTICAL DEVICE

FIELD OF THE INVENTION

The present invention relates to an optical device designed as a molded package with a hybrid-packaging of a plurality of components such as optical components and semiconductor elements on a lead frame. The present invention also relates to a method of manufacturing such an optical device.

RELATED ART

Heretofore, various optical devices and their peripheral components have been devised and developed for optical communication. A typical conventional optical device has two external terminals where one is for electrical signals and the other is for optical signals and a plurality of inner components such as optical components and semiconductor elements. The optical components include a photodiode (PD), a laser diode (LD), a planar lightwave circuit (PLC) board, an optical fiber, and so on, while the semiconductor elements include a preliminary amplifier for driving the LD and so on.

As an example of packaging, the optical device can be designed as a ceramic-packaged structure where the above components are housed in a ceramic housing and covered with a lid formed from metal, glass, ceramic or the like, or encapsulated with a resin.

FIG. 22 is a top view of a ceramic-packaged structure of one of the conventional optical devices. In the figure, the optical device 100 comprises a ceramic-package 111 in which optical components and the like are housed, a plurality of external terminals heads) 112, an optical fiber cord 113 protruded through the side of the package 111, and a plug connector 114 provided on the tip of the optical fiber cord 113.

However, the problem is that such a structure of the conventional optical device is not suitable for mass production in automated facilities because of the optical fiber cord 113 protruding through the side of the ceramic package 111. By the same token, there is another problem that high density mounting cannot be attained because of the following reasons. That is, the above structure of the conventional optical device is not suitable for a reflow-packaging, so that it is generally provided as of a dual inline package (DIP) type and mounted on a circuit board by inserting its external terminals or the like therein.

To solve the above problems, several approaches have been proposed so far to develop an optical device of the type that can be prepared by connecting an optical fiber cord to a package after mounting the package on a circuit board for input/output of optical signals. This kind of the structure can be seen in FIG. 23.

FIG. 23 is a top view of the conventional optical device having such a ceramic-packaged structure of the conventional optical device. In addition to the components shown in FIG. 22, the optical device further comprises a ferrule 121 and a receptacle 122. The ferrule 121 is optically coupled to the inner optical components and protruded from the package. The receptacle is responsible for holding an optical fiber cable to ensure an optical coupling between the optical fiber cable and the ferrule. By the way, it is noted that other parts are the same or like parts as those of FIG. 22, so that they have the same reference characters as those in FIG. 22.

The configuration of the optical device shown in FIG. 23 enables automation of its manufacturing system because a plug connector of an optical fiber (not shown) can be coupled to the receptacle 122 after mounting the package 111 on a circuit board. Therefore, it becomes possible to mount the optical device on the board by means of a re-flowing system.

In this case, however, the optical device is constructed as a ceramic packaged structure, so that there are some problems that the number of components is considerable and the manufacturing process is of high complexity. In addition, ceramic itself is expensive, so that the cost of manufacturing becomes high.

To solve the above problems, an optical device with a molded package in which inner components such as optical components and semiconductor elements are housed in a package and encapsulated with a molding resin by means of a transfer-molding technology has been proposed and developed so far.

FIG. 24 is a top view for illustrating a molded-package structure of the conventional optical device. FIG. 25 is a top view for illustrating a configuration of the optical device shown in FIG. 24, from which a receptacle is being detached. FIG. 26 is a cross-sectional view of the prime constituents of the optical device along the line XXVI—XXVI in FIG. 25. In this case, the conventional optical fiber further comprises a ferrule-mounting portion 131 of a lead frame, a plurality of external lead terminals 132 protruded from both longitudinal sides of the lead frame, a ferrule 133 mounted on the ferrule-mounting portion 131, an optical fiber 134 having one end portion on which the ferrule 133 is coaxially provided, an adhesive by which the ferrule 133 is bonded to the surface of the ferrule-mounting portion 131, and a molding resin 136 that forms a receptacle-inserting guide, a receptacle-securing-portion, and so on. In addition, the reference numeral 137 denotes a receptacle and 138 denotes a split sleeve. A receptacle-inserting guide, a receptacle-fixing portion and so on for mounting the receptacle 137 are formed using a molding resin.

In such a conventional optical device, the lead frame and ferrule 133 are encapsulated with the molding resin 136 by means of transfer molding technique, where one end 133a of the ferrule 133 is externally protruded from the molding resin 136. In addition, the ferrule 133 is placed on a flat surface of the ferrule-mounting portion 131.

We are now going to explain the details of the process for manufacturing the conventional optical device.

To begin with, a lead frame with a plurality of the same patterns connected to each other is formed as shown in FIG. 27. One of such patterns in the lead frame of FIG. 27 is illustrated as an enlarged view in FIG. 28. In the figure, the reference numeral 141 denotes a die pad, 142 denotes an inner lead, 143 denotes a dam bar, 144 denotes an outer frame portion, and 145 denotes a positioning hole. In addition, other components are the same or like components as those of FIGS. 25 and 26, so that they have the same reference characters as those of FIGS. 25 and 26.

Subsequently, the lead frame is subjected to a depressing process (or alternatively referred as a sinking process) by which areas indicated by "P1", "P2", "P3" and "P4" in FIG. 28 are bent into a predetermined angle to lower the die pad 141, and then each component is mounted on the lead frame.

After that, the lead frame is placed on a lower die having positioning pins. The pins are inserted into the positioning holes 145 on the lead frame to make sure that the lead frame is in the right place. Subsequently, an upper die is mated with the lower die to sandwich the lead frame between them. FIG. 29 is a side view of such a configuration shown in the direction of the arrow "X" in FIG. 25. In the figure, the reference numeral 146 denotes the upper die and 147 denotes the lower die. The upper die 146 and the lower die 147 have their own recesses. The recesses are symmetric with respect to the mating surface between them and each recess has a semicircle cross-sectional profile in the direction of the radius thereof. Thus, the recesses form a cylindrical-shaped opening when the upper and lower dies 146, 147 are mated to each other. In addition, the opening has a slightly larger diameter than that of a ferrule 133 to leave a clearance of about 20 micrometers when the ferrule 133 is coaxially placed in the opening. Other components are the same or like components as those of FIG. 25 and FIG. 26, so that they have the same reference characters as those of these figures.

Subsequently, a molten molding resin is injected into a cavity formed between the upper die 146 and the lower die 147 and then cured within a fixed time period, followed by cutting the lead frame at predetermined positions to separate individual optical devices.

In the configuration of the conventional molded package, as described above, the ferrule 133 is positioned on a flat surface of the ferrule-mounting portion 131. Thus, it is difficult to make a correct positioning of the ferrule 133, so that the ferrule 133 cannot be provided in the right place relative to the positioning holes 145 of the lead frame. Consequently, as shown in FIG. 30, there is a problem that the ferrule 133 suffers any damage as a result of the interference between the ferrule 133 and the upper and lower dies 146, 147.

In addition, there is another possibility that the upper die 146 and the lower die 147 may be not in the right place. In this case, as shown FIG. 31, there is a problem that the ferrule 133 suffers any damage as a result of the interference between the ferrule 133 and the upper and lower dies 146, 147.

Furthermore, the lead frame is subjected to the depressing process, so that the variations in the levels of the depressed die pad 141. As a result, there are the possibilities of troubles in optical coupling and so on to be caused by detaching ferrule 133 from the ferrule-mounting portion 131, damaging the optical fiber 134, warping the die pad 141, or the like.

For solving the above problems, there is an idea of shaping the upper and lower dies so as to allow the misalignment of the ferrule 133 and the misalignment of the mating between the upper and lower dies 146, 147. In this case, however, the molding resin will be leaked from the space between the ferrule 133 and the upper and lower dies 146, 147. As a result, the accuracies of outer dimensions of the ferrule 133 will be dropped. Therefore, such a shape cannot be applied on the upper and lower dies 146, 147.

Incidentally, JP-A-10-227952/1998 discloses an optical device having a ferrule-mounting portion which is formed as a upwardly opened structural member in the form of the letter "U" in cross section for the purpose of the positioning of the ferrule. FIG. 32 illustrates a perspective diagram of the conventional optical device disclosed in JP-A-10-227952/1998. In the figure, the reference numeral 151 denotes a lead frame, 152 denotes a ferrule, 153 denotes an optical fiber, 154 denotes a silicon substrate, 155 denotes an optical component, 156 denotes a push plate for holding an optical fiber, and 157 denotes a molding resin. In the lead frame 151, furthermore, the reference numeral 158 denotes a die pad, 159 denotes a ferrule-mounting portion, and 160 denotes a lead.

Regarding such a conventional optical device, the positioning of the ferrule 152 is attained by mounting the ferrule 152 on the upwardly-opened "U"-shaped ferrule-mounting portion. For automatically mounting the ferrule 152, there is a need to create clearance between an inner surface of the "U"-shaped ferrule-mounting portion and an outer peripheral surface of the ferrule 152. In addition, the ferrule-mounting portion 159 may be deviated from the right position with reference to positioning holes on the lead frame. Therefore, such a conventional optical device cannot allow the positioning of the ferrule with very high precision.

SUMMARY OF THE INVENTION

The present invention is implemented to solve the foregoing problems. It is therefore an object of the present invention to provide an optical device and a method for manufacturing the optical device, where damage to a ferrule due to interference between the ferrule and the upper and lower dies is minimized.

It is another object of the present invention to provide an optical device and a method for manufacturing the optical device, where attachment of a ferrule to a ferrule-mounting portion is improved, damage to an optical fiber is minimized, and obstruction to an optical coupling is minimized.

According to a first aspect of the invention, there is provide an optical device having a molded-package structure, comprising: a lead frame having a ferrule-mounting portion; a ferrule mounted on the ferrule-mounting portion; and a molding resin that encapsulates the lead frame and the ferrule by means of a transfer-molding technique except that an end of the ferrule protrudes through the surface of-the molding resin to the outside, wherein a first groove parallel to a longitudinal axis of the ferrule is formed on the ferrule-mounting portion and the ferrule is placed on the first groove.

Here, at least one second groove perpendicular to the first groove may be formed on the ferrule-mounting portion.

At least one second groove perpendicular to the first groove is formed on the ferrule-mounting portion and a filler made of a resin may be provided on a gap between the ferrule and the ferrule-mounting portion.

In a second aspect of the present invention, there is provided an optical device having a molded-package structure, comprising: a lead frame having a ferrule-mounting portion; a ferrule mounted on the ferrule-mounting portion; and a molding resin that encapsulates the lead frame and the ferrule by means of a transfer-molding technique except that an end of the ferrule protrudes through the surface of the molding resin to the outside and an end of the ferrule-mounting portion protrudes through the surface of the molding resin to the outside.

Here, a first groove parallel to a longitudinal axis of the ferrule may be formed on the ferrule-mounting portion and the ferrule may be placed on the first groove.

A first groove parallel to a longitudinal axis of the ferrule may be formed on the ferrule-mounting portion and the ferrule is placed on the first groove, and also at least one second groove perpendicular to the first groove may be formed on the ferrule-mounting portion.

A first groove parallel to a longitudinal axis of the ferrule may be formed on the ferrule-mounting portion and the ferrule may be placed on the first groove, at least one second groove perpendicular to the first groove is formed on the ferrule-mounting portion, and a filler made of a resin is provided on a gap between the ferrule and the ferrule-mounting portion.

Here, the optical device may further comprise a ferrule-mounting member on the ferrule-mounting portion, where the ferrule-mounting member has a concave top surface on which the ferrule is disposed.

In a third aspect of the present invention, there is provided an optical device having a molded-package structure, comprising: a lead frame having a ferrule-mounting portion, a die pad, at least one inner lead, and at least one outer lead; a ferrule mounted on the ferrule-mounting portion; and a molding resin that encapsulates the lead frame and the ferrule by means of a transfer-molding technique except that an end of the ferrule protrudes through the surface of the molding resin to the outside, wherein the die pad and the inner lead are in the same plane.

Here, the optical device may further comprise a recessed portion that extends from the underside of the molding resin to the underside of the die pad, where the recessed portion may be formed at the time of molding using dies.

The optical device may further comprise a recessed portion that extends from the underside of the molding resin to the underside of the die pad, where the recessed portion may be formed at the time of molding using dies and encapsulated with an encapsulating member.

In a fourth aspect of the present invention, there is provided a method for manufacturing an optical device that includes a lead frame having a ferrule-mounting portion, a ferrule mounted on the ferrule-mounting portion, and a molding resin that encapsulates the lead frame and the ferrule by means of a transfer-molding technique except that an end of the ferrule protrudes through the surface of the molding resin to the outside, comprising the steps of: disposing the lead frame on a lower die, where the lead frame has the ferrule-mounting portion on which the ferrule is mounted; and mating the lower die with an upper die to sandwich the lead frame between the upper die and the lower die, wherein one of the upper die and the lower die has a recessed surface facing to the ferrule-mounting side of the ferrule-mounting portion and the other has a flat surface facing to the opposite side of the ferrule-mounting portion, where the recessed surface has a U-shaped recess on which the ferrule is disposed.

In a fifth aspect of the invention, there is provided a method for manufacturing an optical device that includes a lead frame having a ferrule-mounting portion, a ferrule mounted on the ferrule-mounting portion, and a molding resin that encapsulates the lead frame and the ferrule by means of a transfer-molding technique except that an end of the ferrule and an end of the ferrule-mounting portion protrude through the surface of the molding resin to the outside, comprising the steps of: attaching a block member having a cavity for holding the ferrule around the ferrule from one end of the ferrule; placing the lead frame on a lower die, where the lead frame has the ferrule-mounting portion on which the ferrule attached to the block is mounted; and mating the lower die with an upper die to sandwich the lead frame between the upper die and the lower die, wherein the block member has an end face that faces to the ferrule and defines an external shape of the molding resin.

The above and other objects, effects, features and advantages of the present invention will become more apparent from the following description of embodiments thereof taken in consideration with the accompanying drawings.

DETAILED DESCRIPTION OF THE PREFERRED EMBODIMENTS

The invention will now be described with reference to the accompanying drawings.

Figure 1:
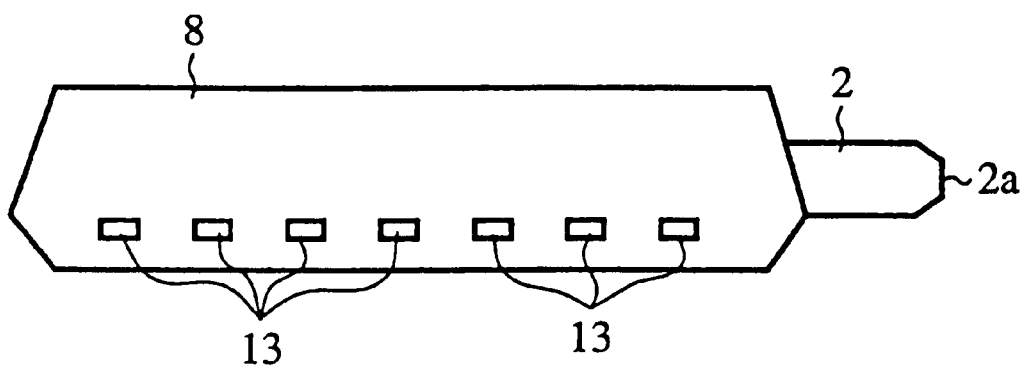
FIG. 1 is a side view of an optical device having a molded-package structure as a first embodiment of the present invention.
Figure 2:
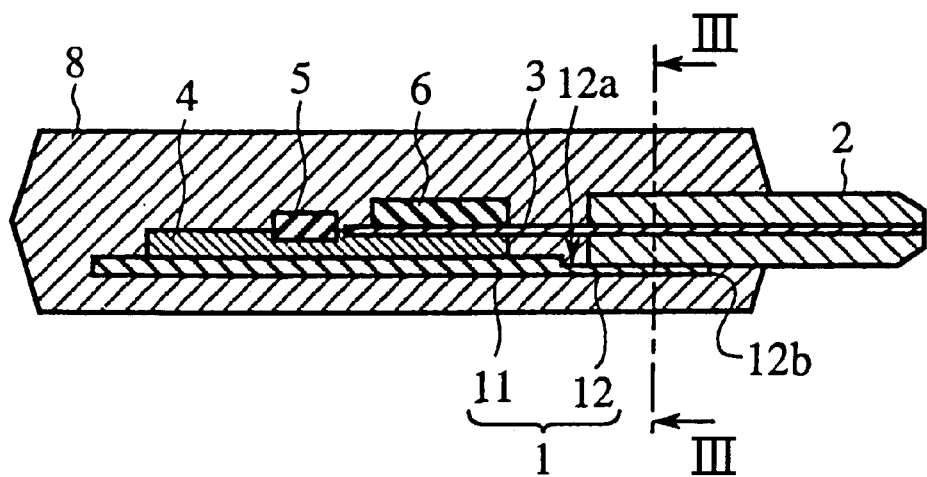
FIG. 2 is a vertical cross sectional view of the optical device having the molded-package structure as the first embodiment of the present invention.
Figure 3:
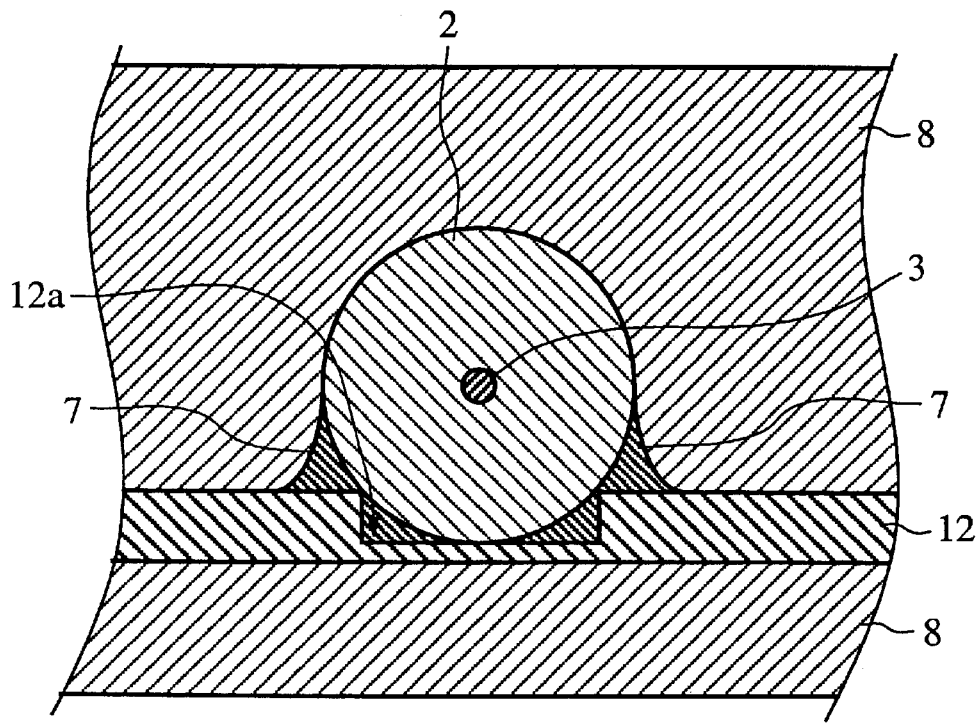
FIG. 3 is a cross sectional view along the line III—III in FIG. 2.

FIG. 1 is a side view of an optical device having a molded package structure as a first embodiment of the present invention. FIG. 2 is a vertical cross sectional view of the optical device having the molded package structure as the first embodiment of the present invention. FIG. 3 is a cross sectional view along the line III—III in FIG. 2 for illustrating the key components of the optical device. In the figures, the reference numeral 1 denotes a lead frame, 2 denotes a ferrule mounted on a ferrule-mounting portion 12 of the lead frame 1, 3 denotes an optical fiber having one end portion coaxially coupled to the ferrule 2 and the other end portion placed on a V-shaped groove, 4 denotes a silicon substrate mounted on a die pad 11 of the lead frame 1, 5 denotes optical components including a laser diode (LD) and a photo-diode (PD) mounted on the silicon substrate 4, 6 denotes an optical fiber-retainer that presses the optical fiber 3 against the silicon substrate 4 to keep it in a particular place on the silicon substrate 4, 7 denotes an adhesive made of a heat-curing resin or a photo-curing resin for fixing the ferrule 2 on the ferrule-mounting portion 12 of the lead frame 1, and 8 denotes a molding resin that covers most of the above components and is shaped into a particular shape.

In the lead frame 1, the reference numeral 11 denotes a die pad, 12 denotes the ferrule-mounting portion provided as a prolonged portion of the die pad 11, and 13 denotes each of outer leads. Also, the reference numeral 12a denotes a half-etched portion (a first groove) formed on the ferrule-mounting portion 12. The half-etched portion 12a is a groove parallel to the longitudinal direction of the ferrule 2. In addition, a width of the half-etched portion 12a is smaller than a diameter of the ferrule 2.

According to the configuration of the optical device of the present embodiment, structural components including the lead frame 1 and the ferrule 2 are encapsulated with the molding resin 8 by means of a transfer molding technique. One end 2a of the ferrule 2 protrudes from the surface of the molding resin 8 to the outside, while the tip 12b of the ferrule-mounting portion 12 remains in the inside of the molding resin 8. Furthermore, the ferrule 2 is placed on the half-etched portion 12a formed on the ferrule-mounting portion 12.

We are now going to explain the details of the process for manufacturing the optical device of the present embodiment.

To begin with, predetermined resist patterns are formed on both sides of a preform of the lead frame. In this case, for the portions to be formed as various holes and slits, openings of the resist patterns are formed on the both sides of the preform. For the portions to be formed as a half-etched portion 12a, an opening of the resist pattern is formed on one of the sides of the preform. Subsequently, a lead frame with a plurality of the same patterns connected to each other is created by etching from the both sides of the preform using the above resist patterns as a mask.

Next, the silicon substrate 4 having the optical component 5 thereon is mounted is mounted on the die pad 11. Then, the ferrule 2 is mounted on the ferrule-mounting portion 12, where the ferrule 2 is placed on the half-etched portion 12a, while the optical fiber 3 is placed, on the V-shaped groove of the silicon substrate 4. In this case, the adhesive 7 is provided into to the half-etched portion 12a in advance. Then, the ferrule 2 is pressed down to the half-etched portion 12 to fix the ferrule 2 on the ferrule-mounting portion 12. Alternatively, the ferrule 2 is mounted on the ferrule-mounting portion 12, followed by providing the adhesive 7 into the space between the ferrule 2 and the ferrule-mounting portion 12 to fix the former on the latter. Subsequently, the optical fiber 3 is fixed on the silicon substrate 4 using the optical fiber retainer 6.

After the above steps, the lead frame 1 is subjected to a molding step using a specific die set comprising a upper die and a lower die. In this case, the lead frame 1 is placed in the right place by means of both positioning holes formed on the lead frame 1 and positioning pins formed on the lower die. Then, the upper die and the lower die are mated with each other to sandwich the lead frame 1 between them. A molten molding resin is injected into a cavity between the upper die and the lower die and then cured within a fixed time period, followed by cutting the lead frame at predetermined positions to separate individual optical devices.

According to the first embodiment, as described above, the ferrule 2 is positioned on the half-etched portion 12a formed on the ferrule-mounting portion 12, so that the ferrule 2 is hardly deviated from the right position with reference to the positioning holes of the lead frame 1.

Therefore, the interference between the upper die and the lower die is hardly occurred when they are mated and clamped together, and thus the present embodiment produces an effect of substantially protecting the ferrule 2 from damage.

The above description has been made on the configuration of the optical device in which the ferrule 2 is positioned on the half-etched portion 12 formed on the ferrule-mounting portion 12. In the present invention, however, it is not limited to such a configuration. It is also possible to attain the same effect as that of the present embodiment by forming a through hole on the ferrule-mounting portion 12 so that a width of the through hole is narrower than a diameter of the ferrule 2 and placing the ferrule 2 on a through hole.

Second Preferred Embodiment

Figure 4:
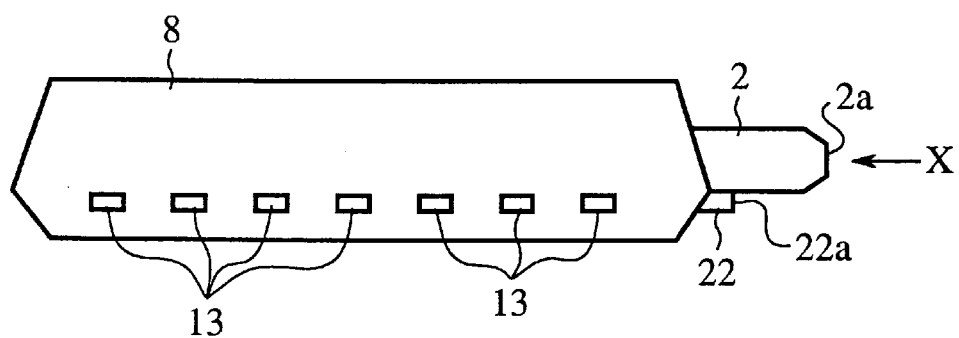
FIG. 4 is a side view of an optical device having a molded-package structure as a second preferred embodiment of the present invention.
Figure 5:
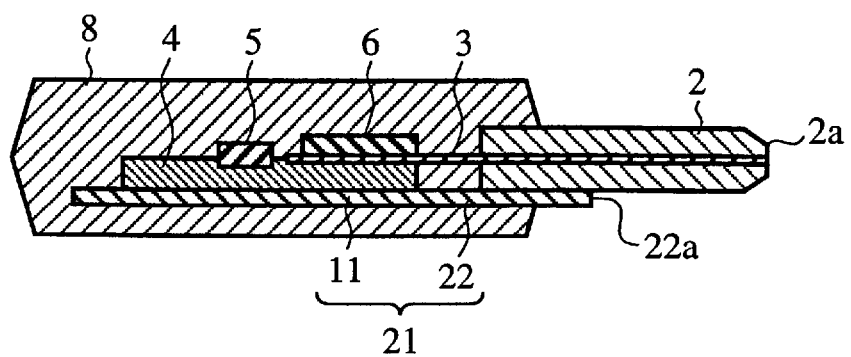
FIG. 5 is a vertical sectional view of the optical device having the molded-package structure as the second preferred embodiment of the present invention.

FIG. 4 is a side view of an optical device having a molded package structure as a second preferred embodiment of the present invention. FIG. 5 is a vertical sectional view of the optical device having the molded package structure as the second preferred embodiment of the present invention. In the figure, the reference numeral 21 denotes a lead frame and 22 denotes a ferrule-mounting portion. Other parts are the same or similar to those of FIGS. 1 to 3, and thus have the same reference numerals as those of FIGS. 1 to 3.

According to the configuration of the optical device of the present embodiment, structural components including the lead frame 21 and a ferrule 2 are encapsulated with a molding resin 8 by means of a transfer molding technique. One end 2a of the ferrule 2 and the tip 22a of the ferrule-mounting portion 22 protrude from the same side of the surface of the molding resin 8 to the outside. Furthermore, the ferrule 2 is placed on a flat surface of the ferrule-mounting portion 22.

For manufacturing such an optical device, the lead frame 21 with the ferrule 2 face down is placed on a lower die. Subsequently, the upper die is mated with the lower die to form a die assembly where the lead frame 21 is sandwiched between these dies.

Figure 6:
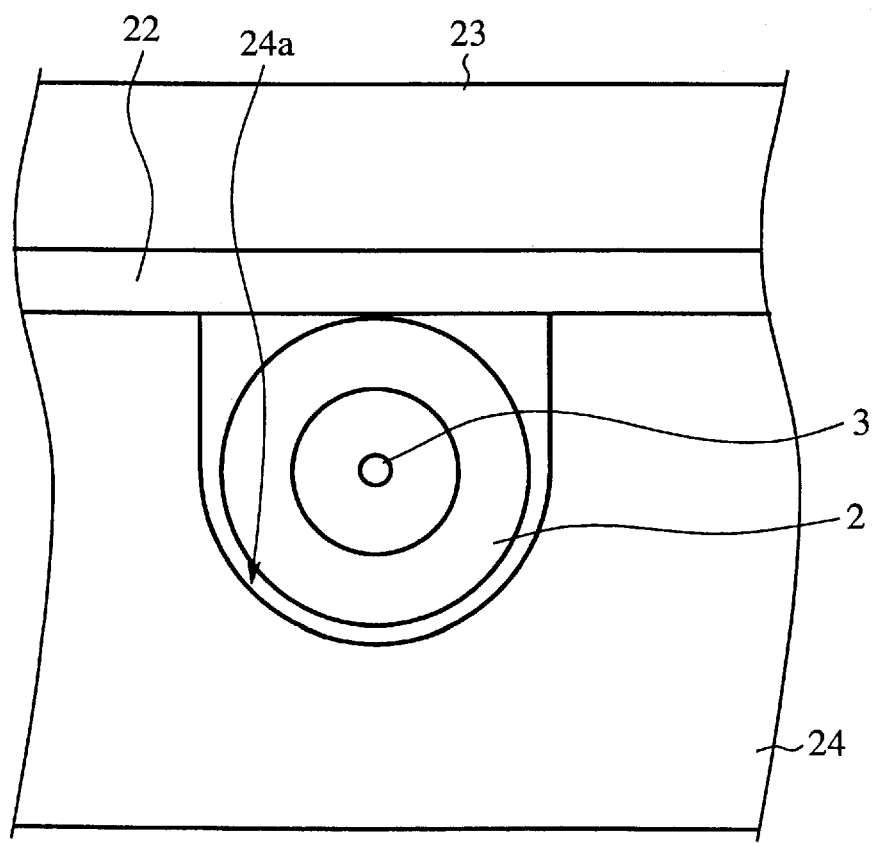
FIG. 6 is a side view of the configuration of a lead frame sandwiched between an upper die and a lower die shown from the direction of the arrow X in FIG. 4 for illustrating the process for manufacturing the optical device of the second preferred embodiment of the present invention.
Figure 29:
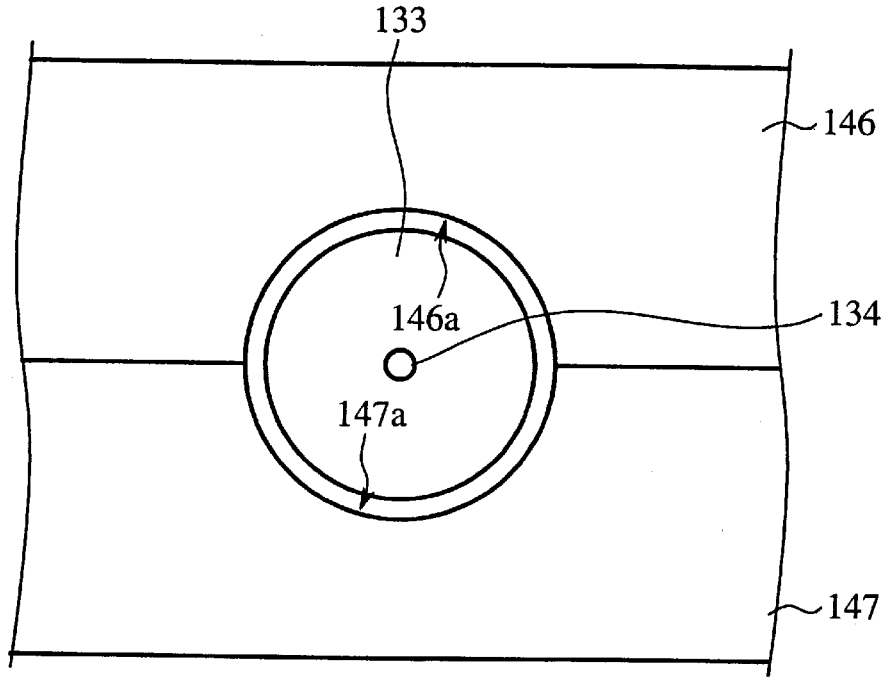
FIG. 29 is a side view of the configuration of a lead frame sandwiched between an upper die and a lower die shown from the direction of the arrow X in FIG. 25 for illustrating the process for manufacturing the conventional optical device.
Figure 30:
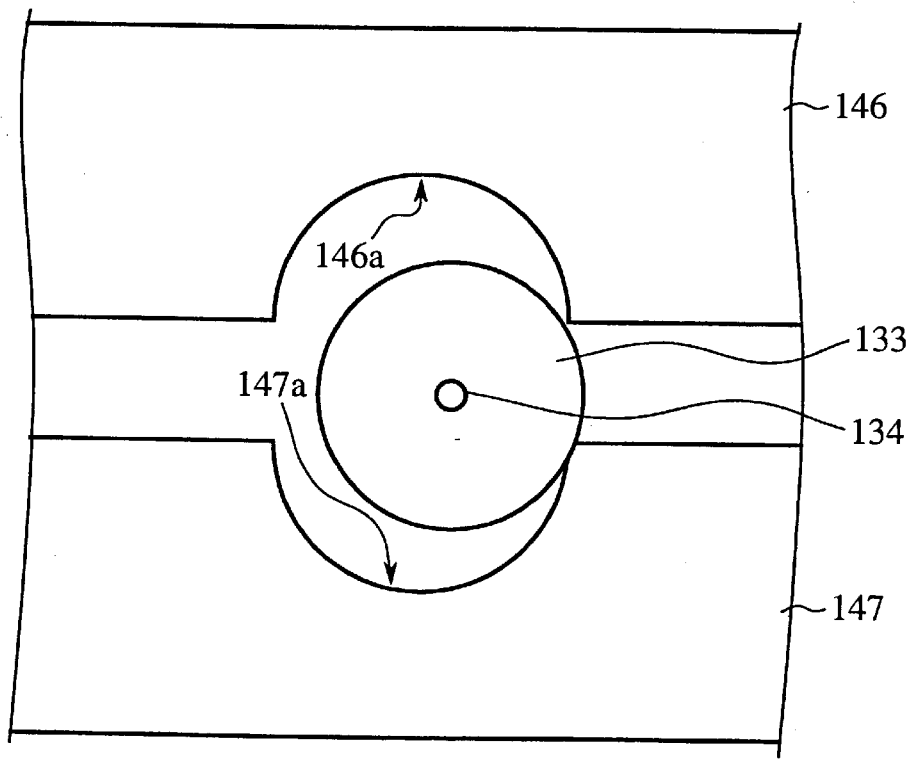
FIG. 30 is a vertical cross sectional view of the configuration of a lead frame sandwiched between an upper die and a lower die for illustrating a problem that lies within the conventional optical device having the molded package structure with a misalignment of a ferrule relative to positioning holes of the lead frame.
Figure 31:
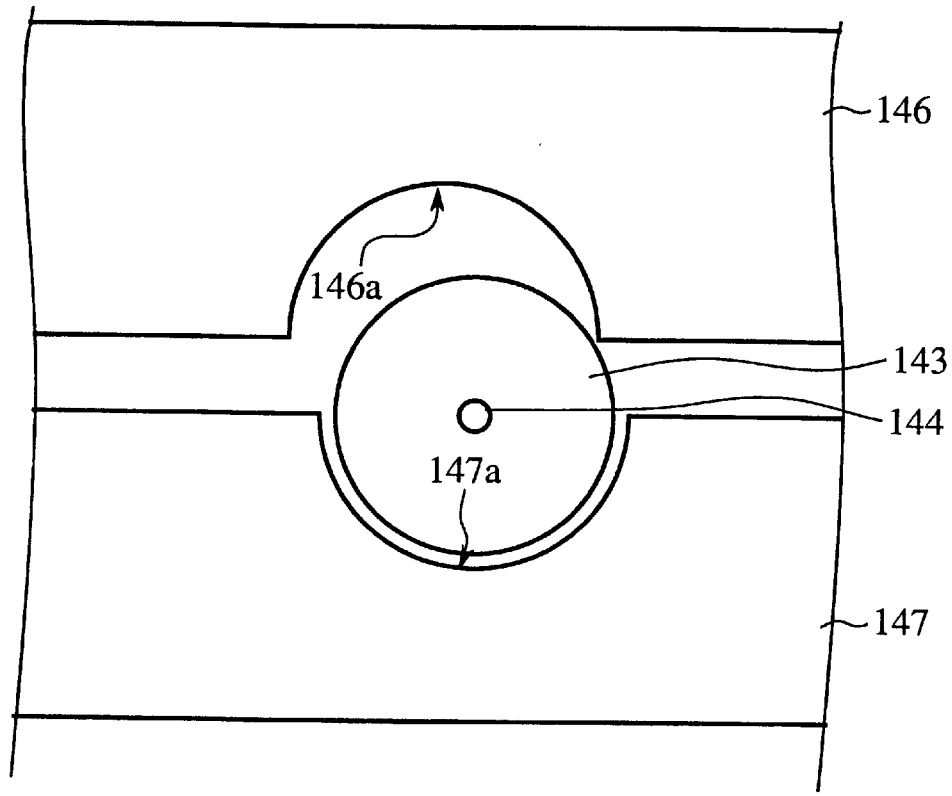
FIG. 31 is a vertical cross sectional- view of the configuration of a lead frame sandwiched between an upper die and a lower die with a misalignment between the dies for illustrating a problem that lies within the conventional optical device having the molded package structure.
Figure 32:
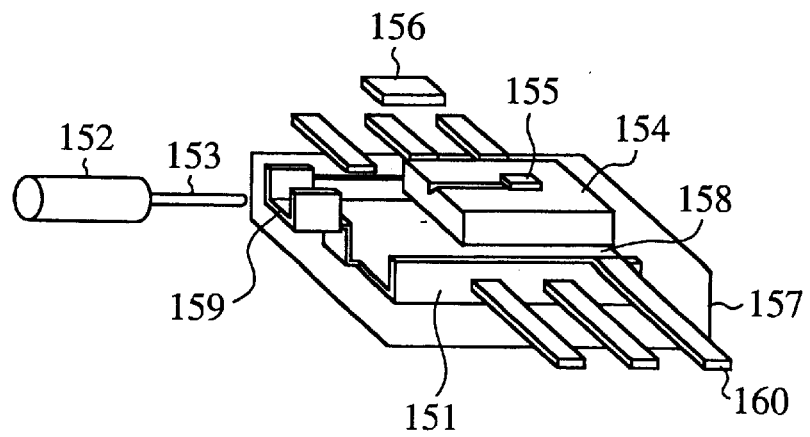
FIG. 32 a perspective view of the conventional optical device disclosed in JP-A-10-227952.

FIG. 6 is a side view shown from the direction of the arrow X in FIG. 4 for illustrating the condition of the lead frame 21 being sandwiched between the upper die and the lower die. In the figure, reference numeral 23 is an upper die and 24 is a lower die. The lower die 24 has a hollow portion 24a with an upwardly-opened "U" shape in cross section, while the upper die 23 has a flat portion facing to the "U"-shaped hollow portion 24a of the lower die 24. The ferrule 2 lies in the "U"-shaped hollow portion 24a, and also the ferrule-mounting portion 22 is sandwiched between the upper die 23 and the lower die 24. Other parts are the same or like parts as those of FIG. 29, so that they have the same reference characters as those in FIG. 29.

According to the second preferred embodiment, the ferrule 2 lies in the U-shaped hollow portion when the lead frame 21 is sandwiched between the upper die 23 and the lower die 24, so that the interaction between the ferrule 2 and the upper die 23 cannot occur even if the upper die 23 is misaligned with respect to the lower die 24, leaving the ferrule 2 intact.

According to the second preferred embodiment, the tip 22a of the ferrule-mounting portion 22 is protruded from the molding resin 8 to the outside, so that we have an effect that an adhesive strength between the ferrule 2 and the lead frame 21 can be increased by extending the area involved in the bonding between ferrule 2 and the lead frame 21.

Third Preferred Embodiment

Figure 7:
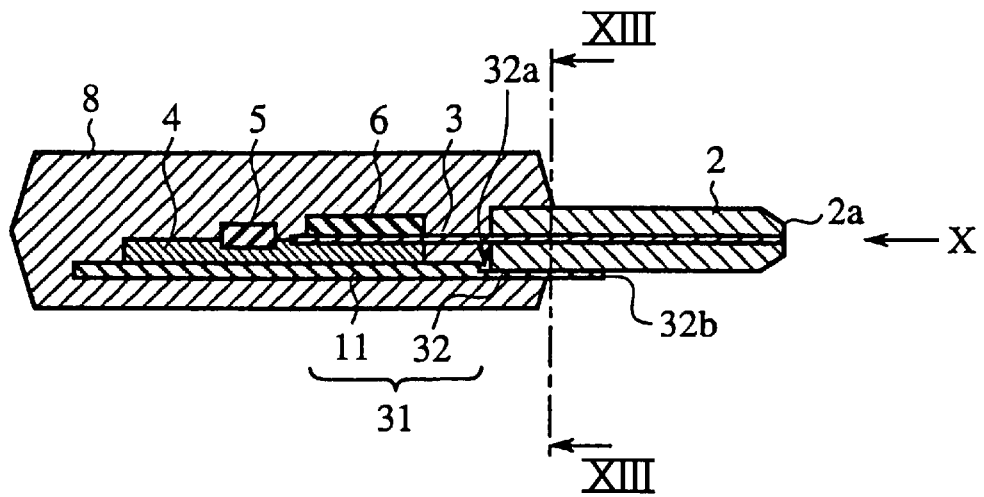
FIG. 7 is a vertical cross sectional-view of an optical device having a molded-package structure as a third preferred embodiment of the present invention.
Figure 8:
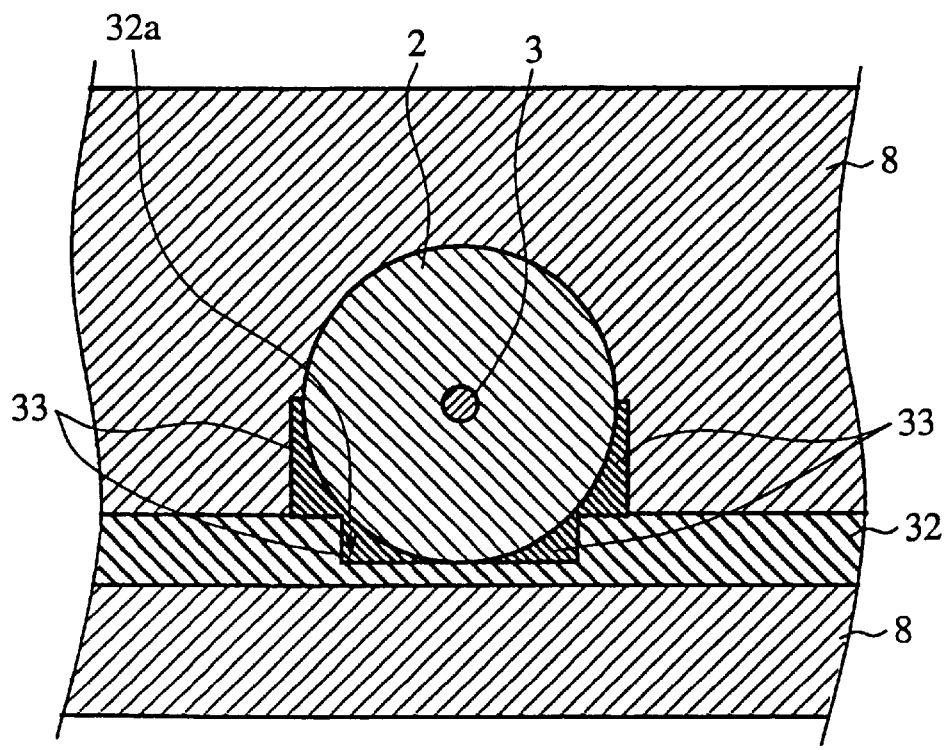
FIG. 8 is a cross sectional view along the line VIII—VIII in FIG. 8.
Figure 9:
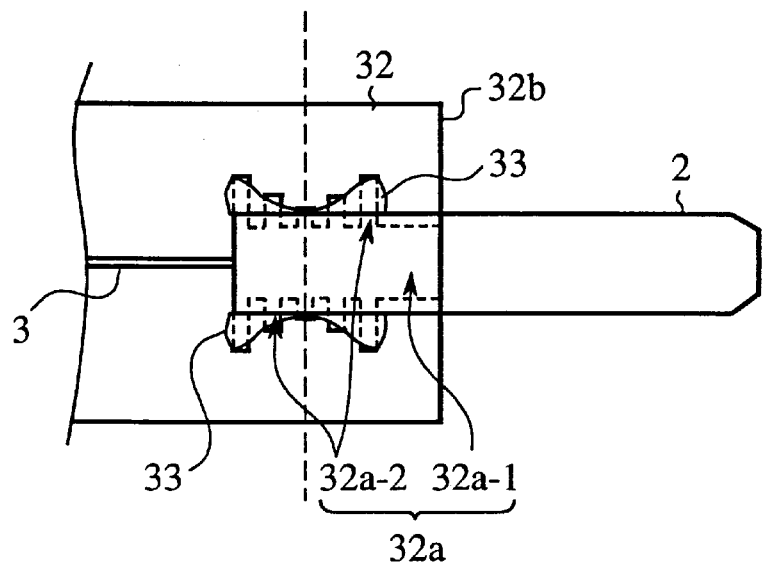
FIG. 9 is a top view of a ferrule-mounting portion of a lead frame in the optical device having the molded-package structure of the third preferred embodiment of the present invention, in which a filling member is provided.
Figure 10:
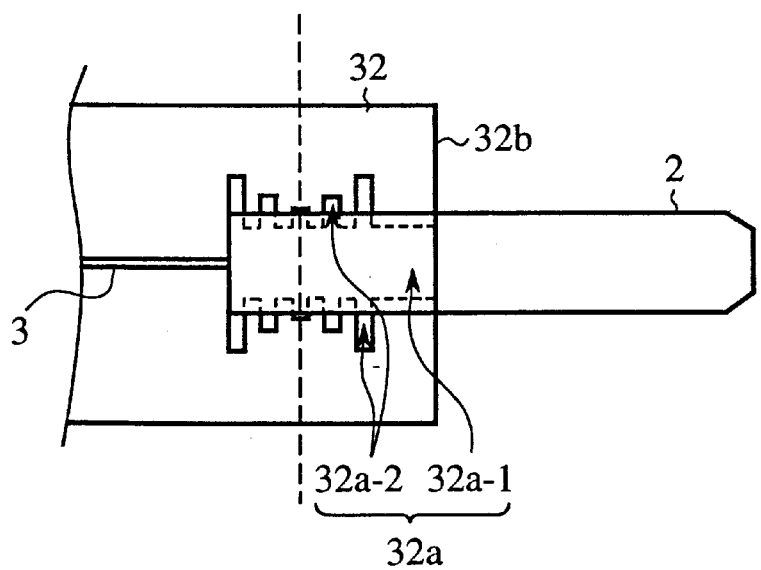
FIG. 10 is a top view of the ferrule-mounting portion of the lead frame in the optical device having the molded-package structure of the third preferred embodiment of the present invention, in which the filling member is not provided.

FIG. 7 is a vertical cross sectional view of an optical device having a molded package structure as a third preferred embodiment of the present invention. FIG. 8 is a cross sectional view along the broken line VIII—VIII in FIG. 7 for illustrating the prime constituents of the optical device. FIGS. 9 and 10 are top views of a ferrule-mounting portion of a lead fame in an optical device having a molded package structure as a third preferred embodiment of the present invention, where FIG. 9 illustrates the ferrule-mounting portion with a filling member and FIG. 10 illustrates the ferrule-mounting portion without the filling member.

In the figure, the reference numeral 31 denotes a lead frame, 32 denotes a ferrule-mounting portion, 33 denotes a filing member made of a resin being filled in the gap between the ferrule-mounting portion 32 and the ferrule 2, and 32a denotes a half-etched portion. The half-etched portion 32a comprises a first groove 32a-1 parallel to the direction of a longitudinal axis of the ferrule 2 and a second groove 32a-2 perpendicular to the first groove 32a-1. Other parts are the same or like parts as those of FIGS. 1 to 3, so that they have the same reference characters as those in these figures. In each of FIGS. 9 and 10, a dashed line indicates the boundary of the molding resin 8.

According to the configuration of the optical device of the present embodiment, structural components including the lead frame 31 and the ferrule 2 are encapsulated with the molding resin 8 by means of a transfer molding technique. One end 2a of the ferrule 2 and the tip 32b of the ferrule-mounting portion 32 are protruded from the same side of the surface of the molding resin 8 to the outside. Furthermore, the ferrule 2 is placed on the first groove 32a-1 of the half-etched portion 32a formed on the ferrule-mounting portion 32.

The filing member 33 is formed by previously providing a resin into the half-etched portion 32. Then, the ferrule 2 is pressed against the first groove 32a-1 of the half-etched portion 32a. Alternatively, the filling member 33 is formed by providing a resin into the gap between the ferrule 2 and the ferrule-mounting portion 32 after mounting the ferrule 2 on the ferrule-mounting portion 32. Alternatively, the filling member 33 is formed by the process including the steps of previously providing a resin into the half-etched portion 32, pressing the ferrule 2 against the first groove 32a-1 of the half-etched portion 32, and further providing a resin into the gap between the ferrule 2 and the ferrule-mounting portion 32. In this case, the resin to be used in the present embodiment may be a photo-curing resin or a heat-curing resin or a mixture of these resins.

If the filling member 33 is filled insufficiently, the molding resin may be leaked from the gap formed between the filling member 33 and the lower die 35 when the molding resin is injected into a cavity between the upper die 34 and the lower die 35. If the filling member 33 is filled excessively, it is difficult to properly place the lead frame 31 on the lower die 35. Thus, the first groove 32a-1 is coupled to the ferrule-mounting portion 32 and a plurality of second grooves 32a-2 is formed on both sides of the first groove 32a-1 so that each of the second grooves 32-2 extends to the direction perpendicular to the first groove 32a-1. Furthermore, the filling member 33 has a desired fillet-shape. Such a filling member 33 is formed by the steps of regulating a length of each of the second grooves 32a-2 and also regulating a viscosity of the resin involved in the formation of the filling member 33.

Figure 11:
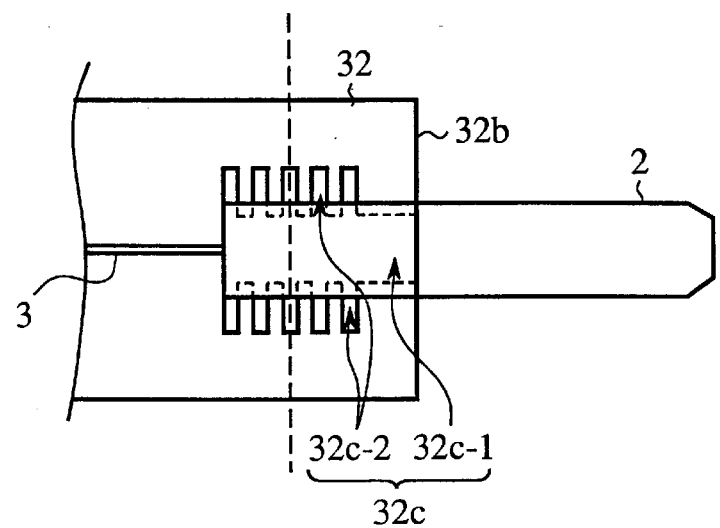
FIG. 11 is a top view for illustrating a modified example of a half-etched portion formed on the ferrule-mounting portion of the lead frame in the optical device of the third preferred embodiment of the present invention.

FIG. 11 is a top view for illustrating a modified example of the half-etched portion formed on the ferrule-mounting portion 32 of the lead frame 31. In the figure, the reference numeral 32c denotes a half-etched portion formed on the ferrule-mounting portion 32. The half-etched portion 32c comprises a first groove 32c-1 parallel to a longitudinal axis of the ferrule 2 and a second groove 32c-2 perpendicular to the first groove 32c-1. Other parts are the same or like parts as those of FIGS. 9 and 10, so that they have the same reference characters as those of FIGS. 9 and 10.

Figure 12:
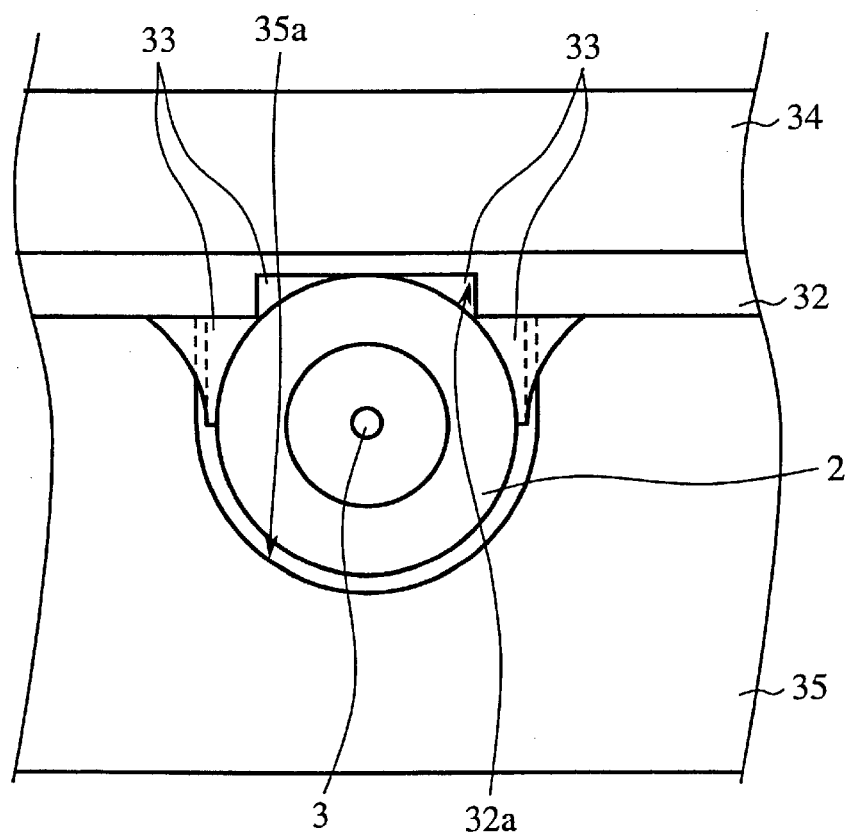
FIG. 12 is a side view of the configuration of a lead frame sandwiched between an upper die and a lower die shown from the direction of the arrow X in FIG. 7 for illustrating the process for manufacturing the optical device of the third preferred embodiment of the present invention.

For manufacturing such an optical device, the lead frame with the ferrule 2 face down is placed on the lower die. Subsequently, the upper die is mated with the lower die to form a die assembly where the lead frame is sandwiched between these dies. FIG. 12 is a side view shown from the direction of the arrow X in FIG. 7 for illustrating the condition of the lead frame 31 being sandwiched between the upper die 34 and the lower die 35. In the figure, the reference numeral 34 denotes the upper die and 35 denotes the lower die. The lower die 35 has a hollow portion 35a with an upwardly-opened "U" shape in cross section, while the upper die 34 has a flat portion facing to the "U"-shaped hollow portion 35a of the lower die 35. The ferrule 2 and the filling member 33 lie in the "U"-shaped hollow portion 35a, and also the ferrule-mounting portion 32 is sandwiched between the upper die 34 and the lower die 35. It is preferable that the distance between the filling member 33 and the lower die 35 is 30 μm or less. Other parts are the same or like parts as those of FIGS. 7 to 10, so that they have the same reference characters as those in FIGS. 7 to 10.

According to the third preferred embodiment, the ferrule 2 lies in the U-shaped hollow portion when the lead frame 31 is sandwiched between the upper die 34 and the lower die 35, so that the interaction between the ferrule 2 and the upper die 34 cannot occur even if the upper die is misaligned with respect to the lower die, producing an effect that the ferrule remains intact.

Thus, the first groove 32a-1 is coupled to the ferrule-mounting portion 32 and a plurality of second grooves 32a-2 is formed on both sides of the first groove 32a-1 so that each of the second grooves 32-2 extends to the direction perpendicular to the first groove 32a-1. Furthermore, a filling member 33 with a desired fillet-shape is formed in the gap between the ferrule 2 and the ferrule-mounting portion 32. Therefore, the present embodiment produces the effect of preventing the leakage of the molding resin 8 injected into the cavity between the upper die 34 and the lower die 35. According to the third preferred embodiment, furthermore, the same effects as those of the first and second embodiments can be also obtained.

Fourth Preferred Embodiment

Figure 13:
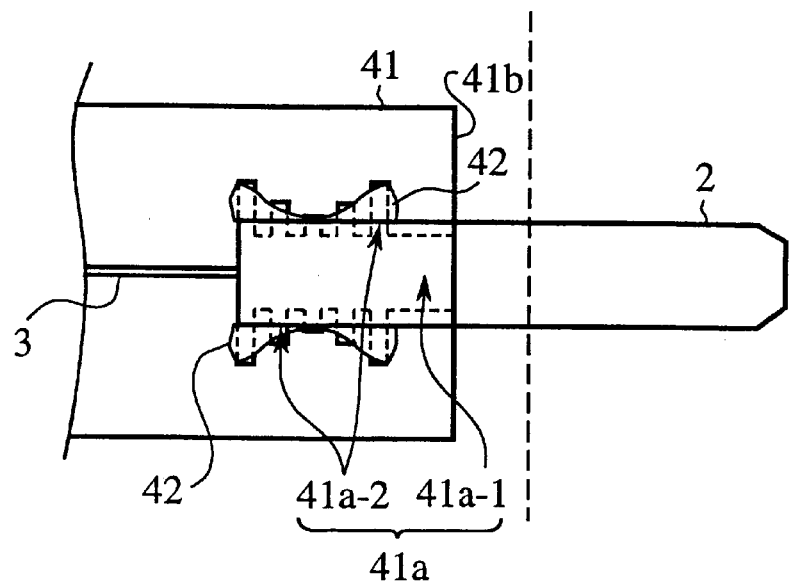
FIG. 13 is a top view of a ferrule mounting portion of a lead frame in the optical device having the molded-package structure of the fourth preferred embodiment of the present invention, in which a filling member is provided.
Figure 14:
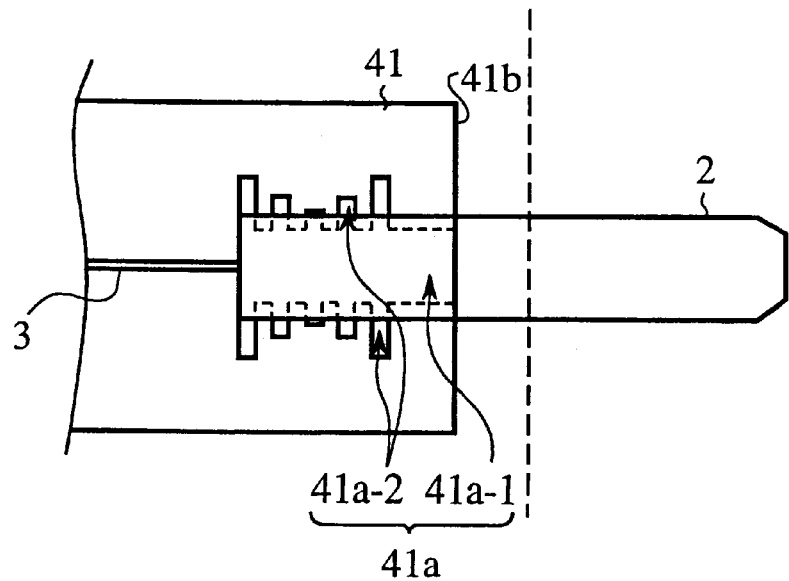
FIG. 14 is a top view of the ferrule-mounting portion of the lead frame in the optical device having the molded-package structure of the fourth preferred embodiment of the present invention, in which the filling member is not provided.

FIGS. 13 and 14 are top views of a ferrule-mounting portion of a lead frame in an optical device having a molded package structure as a fourth preferred embodiment of the present invention. In addition, a filling member is shown in FIG. 13 but not in FIG. 14. In these figures, the reference numeral 41 denotes a ferrule-mounting portion, 42 denotes a filling member provided in the gap between the ferrule 2 and the ferrule-mounting portion 41. The reference numeral 41a denotes a half-etched portion that comprises a first groove 41a-1 parallel to a longitudinal direction of the ferrule 2 and a second groove 41a-2 perpendicular to the first groove 41a-1. Other parts are the same or like parts as those of FIGS. 1 to 3, so that they have the same reference characters as those in FIGS. 1 to 3. In each of FIGS. 13 and 14, a dashed line indicates the boundary of the molding resin 8.

According to the configuration of the optical device of the present embodiment, structural components including the lead frame and the ferrule 2 are encapsulated with the molding resin 8 by means of a transfer molding technique. One end 2a of the ferrule 2 is protruded from the molding resin 8 to the outside, while the tip 41b of the ferrule-mounting portion 41 is not protruded therefrom. Furthermore, the ferrule 2 is placed on the first groove 41a-1 of the half-etched portion 41a formed on the ferrule-mounting portion 41.

The optical device of the present invention differs from that of the third preferred embodiment only in that the tip 41b of the ferrule-mounting portion 41 of the present embodiment is not protruded from the molding resin 8.

According the fourth preferred embodiment, as described above, the first groove 41a-1 is coupled to the ferrule-mounting portion 41. Also, a plurality of second grooves 41a-2 extends along the direction perpendicular to the first groove 41a-1 and is formed on both sides of the first groove 41a-1. A filling member 42 having a desired fillet-shape is formed in the gap between the ferrule 2 and the ferrule-mounting portion 41. Therefore, the present embodiment produces the effect of increasing an adhesive strength between the ferrule 2 and the lead frame more than that of the first preferred embodiment.

Fifth Preferred Embodiment

Figure 15:
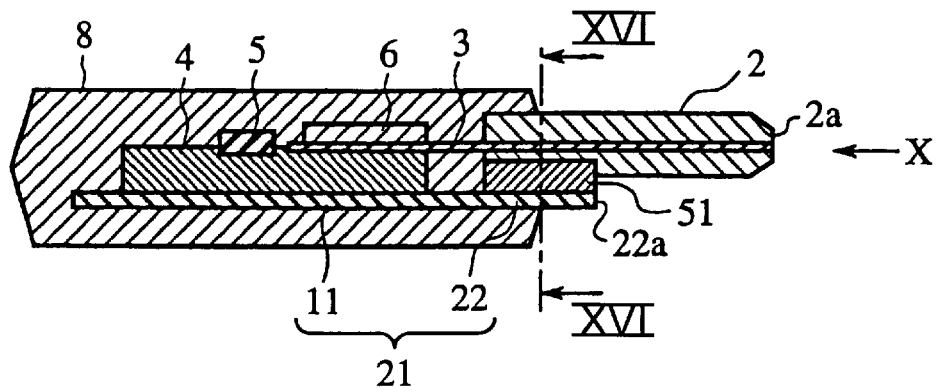
FIG. 15 is a vertical cross sectional view of an optical device having a molded-package structure as a fifth preferred embodiment of the present invention.
Figure 16:
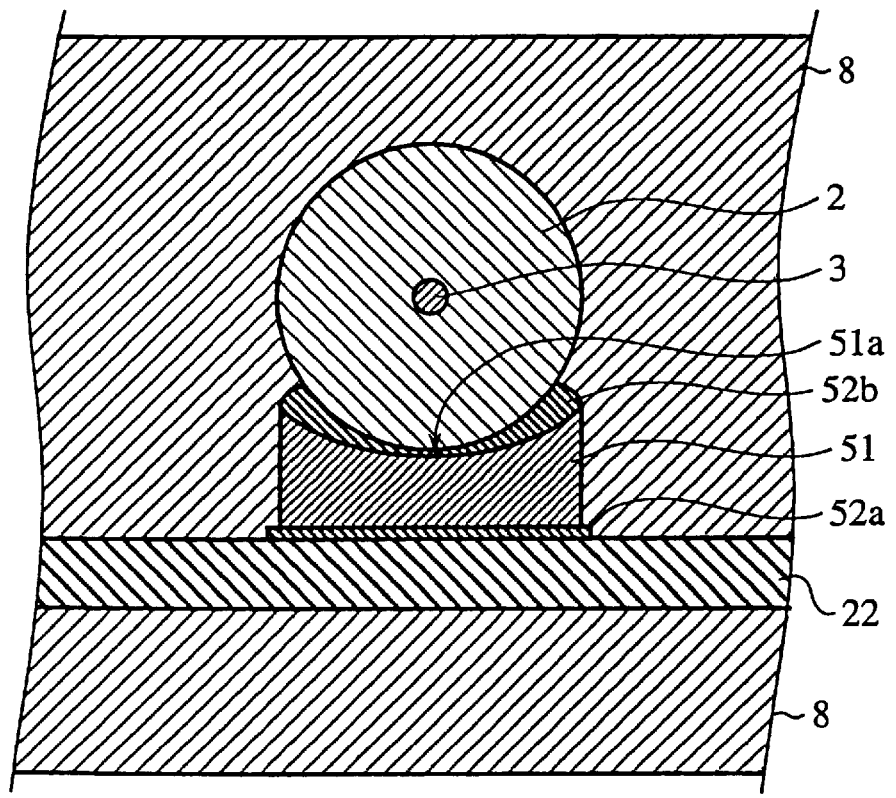
FIG. 16 is a cross sectional view along the line XVI—XVI in FIG. 15.

FIG. 15 is a vertical cross sectional view of an optical device having a molded package structure as a fifth preferred embodiment of the present invention. FIG. 16 is a cross sectional view along the broken line XVI—XVI in FIG. 15 for illustrating the prime constituents of the optical device. In the figure, the reference numeral 51 denotes a ferrule-mounting member formed on the ferrule-mounting portion 22, 52a denotes a first adhesive made of a photo-curing resin or a heat-curing resin that fixes the ferrule-mounting member 51 on the ferrule-mounting portion 22, and 52b denotes a second adhesive made of a photo-curing resin or a heat-curing resin that fixes the ferrule 2 on the ferrule-mounting member 51. Other parts are the same or like parts as those of FIGS. 4 to 6, so that they have the same reference characters as those of FIGS. 4 to 6.

According to the configuration of the optical device of the present embodiment, structural components including the lead frame 21 and the ferrule 2 are encapsulated with the molding resin 8 by means of a transfer molding technique. One end 2a of the ferrule 2 and the tip 22a of the ferrule-mounting portion 22 are protruded from the same side of the surface of the molding resin 8 to the outside. Furthermore, the ferrule 2 is placed on the top 51a of the ferrule-mounting member 51 formed on the ferrule-mounting portion 22.

The top 51a of the ferrule-mounting member 51 is in the shape of a concave surface with a curvature radius slightly larger than that of the ferrule 2. If the ferrule 2 is 1.25 mm in diameter, the top 51a of the ferrule-mounting member 51 has a curvature radius that extends from 0.65 mm to 0.75 mm. Furthermore, the ferrule-mounting member 51 is made of a material such as a ceramic material or a high-temperature resin capable of resisting high temperatures at the step of molding (about 180° C.) or the step of re-flowing (about 240° C.).

Figure 17:
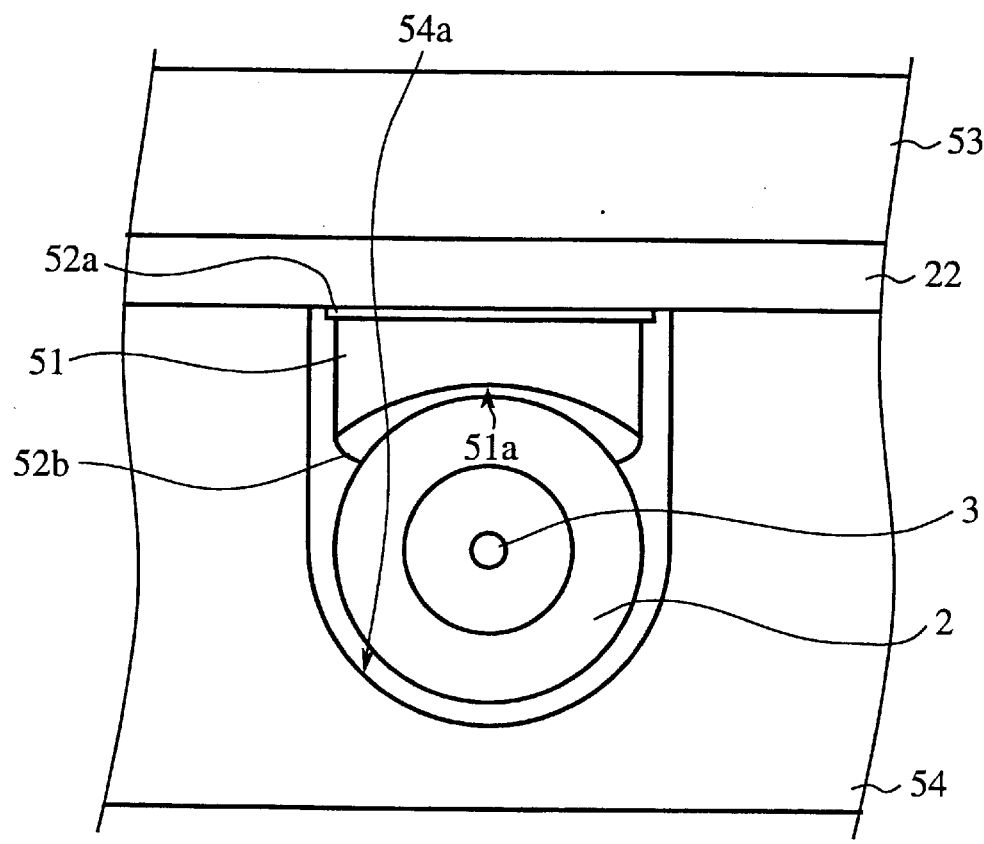
FIG. 17 is a side view of the configuration of a lead frame sandwiched between an upper die and a lower die shown from the direction of the arrow X in FIG. 15 for illustrating the process for manufacturing the optical device of the fifth preferred embodiment of the present invention.

For manufacturing such an optical device, the lead frame 21 with the ferrule 2 face down is placed on the lower die. Subsequently, the upper die is mated with the lower die to form a die assembly where the lead frame is sandwiched between these dies. FIG. 17 is a side view shown from the direction of the arrow X in FIG. 15 for illustrating the condition of the lead frame 21 being sandwiched between the upper die and the lower die. In the figure, reference numeral 53 is an upper die and 54 denotes a lower die. The lower die 54 has a hollow portion 54a with an upwardly-opened "U" shape in cross section, while the upper die 53 has a flat portion facing to the "U"-shaped hollow portion 54a of the lower die 54. The ferrule 2 and the ferrule-mounting member 51 lie in the "U"-shaped hollow portion 54a, and also the ferrule-mounting member 51 is sandwiched between the upper die 53 and the lower die 54. The distance between the ferrule-mounting member 51 and the lower die 54 is 30 μm or less. Other parts are the same or like parts as those of FIGS. 15 and 16, so that they have the same reference characters as those in FIGS. 15 and 16.

According to the fifth preferred embodiment, as described above, the ferrule-mounting member 51 is formed on the ferrule-mounting portion 22, and also the ferrule 2 is positioned on the top 51a of the ferrule-mounting member 51 formed on the ferrule-mounting portion 22, so that limits of thickness of each component that constitute the optical device can be relaxed by controlling both the thickness of the ferrule-mounting member 51 and the depth of the "U"-shaped hollow portion 54a formed on the lower die 54.

Furthermore, the fifth preferred- embodiment produces the same effect as that of the second preferred embodiment.

Sixth Preferred Embodiment

Figure 18:
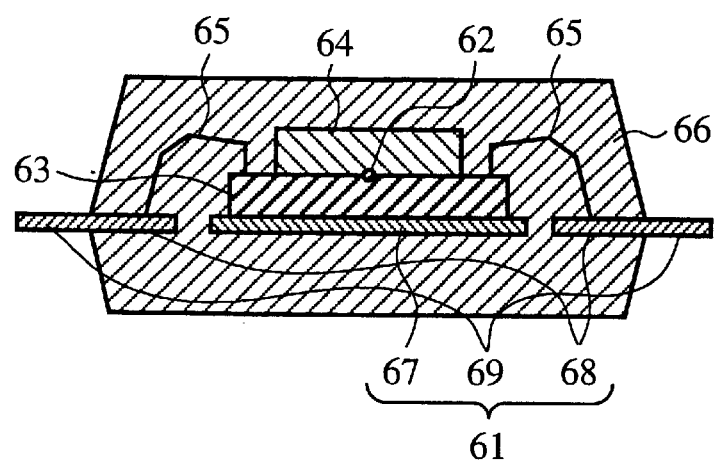
FIG. 18 is a cross sectional view of an optical device having a molded-package structure as a sixth preferred embodiment of the present invention.

FIG. 18 is a cross sectional view of an optical device having a molded package structure as a sixth preferred embodiment of the present invention. The reference numeral 61 denotes a lead frame, 62 denotes an optical fiber having one end portion on which a ferrule is placed and the other end portion that lies in the "V"-shaped groove formed on the top of the silicon substrate 63. The reference numeral 63 denotes a silicon substrate mounted on a die pad 67 of the lead frame 61, and also 64 denotes an optical fiber retainer for securing an optical fiber 62 on a silicon substrate 63 by pressing the optical fiber 62 against the silicon substrate 63. The reference numeral 65 denotes a wire that connects an inner lead 68 to a pad on the silicon substrate 63 and 66 denotes a molding resin.

The lead frame 61 comprises a die pad 67, an inner lead 68, and an outer lead 69. The die pad 67 and the inner lead 68 are all in the same plate.

In the optical device of the present embodiment, the ferrule mounted on the ferrule-mounting portion of the lead frame 61 and so on are encapsulated with the molding resin 66 by means of a transfer-molding technology, while one end of the ferrule protrudes through the surface of the molding resin 66.

In the conventional optical device, however, the lead frame is subjected to a depressing process to lower the die pad so that the optical fiber and the top of the silicon substrate are in- the same plane to place the other end of the optical fiber in the V-shaped groove formed on the top of the silicon substrate. In this case, however, the variations (±50 μm) in the levels of the depressed die pad and warping of the die pad are observed. Regarding the conventional optical device, there is the possibility that the ferrule may detach from the ferrule-mounting portion or the optical fiber is damaged when the lead frame is sandwiched between the upper die and the lower die. There is also the possibility that the optical coupling among the optical components is damaged when the die pad warps.

The optical device of the present embodiment, on the other hand, the lead frame 61 is not subjected to a depressing process. The die pad 67 and the inner lead 68 are placed in the same plane, and thus the other end of the optical fiber 62 lies in the V-shaped groove formed on the top of the silicon substrate 63 regulated the thickness thereof According to the sixth preferred embodiment, as described above, the die pad 67 and the inner lead 68 are in the same plane because the lead frame 61 is not subjected to the depressing process. Thus, there is no possibility that the ferrule may be detached from the ferrule-mounting portion or the optical fiber 62 may be damaged when the lead frame. 61 is sandwiched between the upper die and the lower die. Also, there is no possibility that the optical coupling among the optical components may be damaged because the die pad has no warpage.

Seventh Preferred Embodiment

Figure 19:
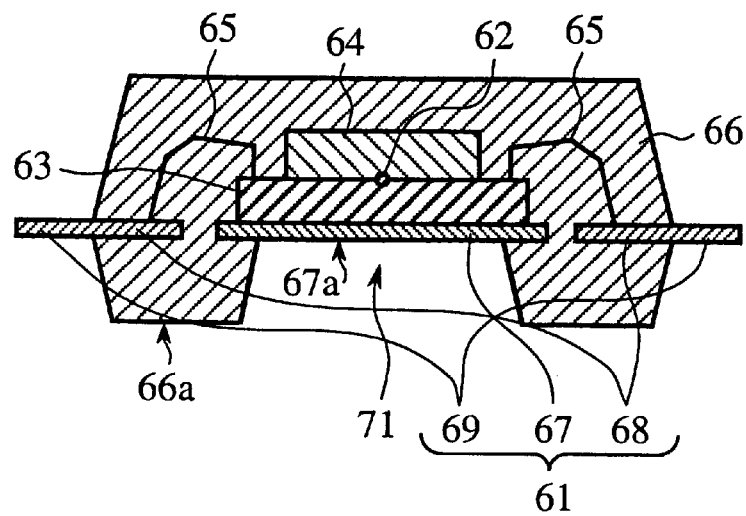
FIG. 19 is a cross sectional view of an optical device having a molded-package structure as a seventh preferred embodiment of the present invention.

FIG. 19 is a cross sectional view of an optical device having the molded package structure as a seventh preferred embodiment of the present invention. In the figure, the reference numeral 71 denotes a recessed portion that extends from the underside 66a of a molding resin 66 to the underside 67a of a die pad 67. The recessed portion 71 is formed at the step of molding using a die. Other parts are the same or like parts as those of FIG. 18, so that they have the same reference characters as those in FIG. 18.

In the optical device of the present embodiment, the lead frame 61, the ferrule mounted on the ferrule-mounting portion of the lead frame 61, and so on are encapsulated with the molding resin 66 by means of a transfer-molding technology, while one end of the ferrule protrudes through the surface of the molding resin 66.

The optical device of the present invention differs from that of the sixth preferred embodiment only in that the recessed portion 71 is formed so that it extends from the underside 66a of a molding resin 66 to the underside 67a of a die pad 67.

In the process of manufacturing such an optical device, a die having a block member for receiving the underside 67a of the die pad 67 is used as a die to be positioned on the underside 67a of the die pad 67. A contact area between the above block member and the underside 67a of the die pad 67 is smaller than an area of the underside 67a of the die pad 67. If the block member is not formed on the die to be positioned on the underside 67a of the die pad 67, the die pad 67 is vertically sifted its position because the molding resin is unevenly flowed into to the gap between the upper die and the lower die formed by mating the dies together. In this case, therefore, there is a possibility that the ferrule may detach from the ferrule-mounting portion or the optical fiber is damaged as molding. There is also the possibility that the optical coupling among the optical components is damaged when the die pad warps as the die pad vertically shifts its position.

According to the seventh preferred embodiment, as described above, the die having the block member for receiving the underside 67a of the die pad 67 is used as a die to be positioned on the underside 67a of the die pad 67 when the lead frame is sandwiched between the upper die and the lower die. Thus, the recessed portion 71 is formed so that it extends from the underside 66a of a molding resin 66 to the underside 67a of a die pad 67. Comparing with the sixth preferred embodiment, the present embodiment is more effective at preventing problems such as the ferrule detaching from the ferrule-mounting portion or the optical fiber being damaged as molding. Therefore, the present embodiment produces the effect of avoiding such problems in the optical coupling among the optical components when the die pad warps.

According to the seventh preferred embodiment, in addition, the recessed portion 71 is formed from the underside 66a of the molding resin 66 to the underside 67a of the die pad 67. Therefore, the present embodiment produces the effect of facilitating the release of heat to be generated at the time of operating the optical device.

According to the seventh preferred embodiment, furthermore, the seventh preferred embodiment produces the same effect as that of the six preferred embodiment.

Eighth Preferred Embodiment

Figure 20:
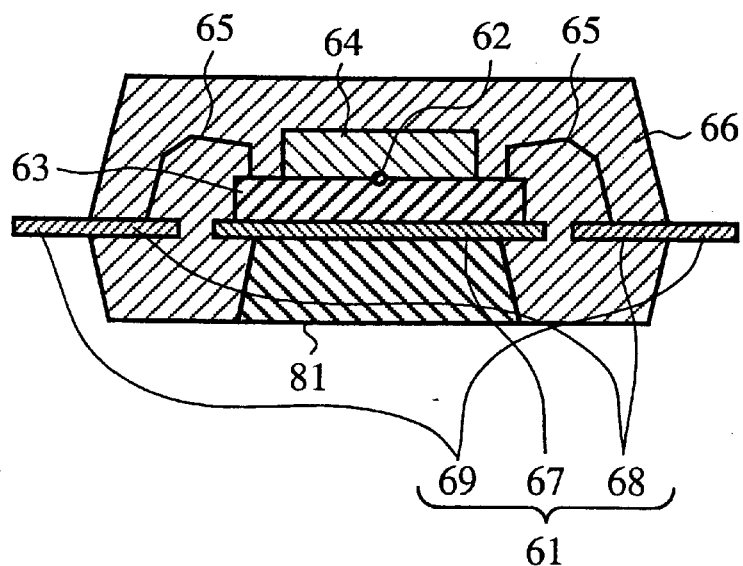
FIG. 20 is a cross sectional view of an optical device having a molded-package structure as an eighth preferred embodiment of the present invention.

FIG. 20 denotes a cross sectional view of a molded package structure of an optical device as an eighth preferred embodiment of the present invention. In the figure, the reference numeral 81 denotes an encapsulating member for encapsulating the recessed portion 71. The encapsulating member 81 is formed by pouring a resin into the hollow portion. In this case, the encapsulating resin may be a liquid heat-curing resin. Other parts are the same or like parts as those of FIG. 19, so that they have the same reference characters as those in FIG. 19.

In the optical device of the present embodiment, the lead frame 61, the ferrule mounted on the ferrule-mounting portion of the lead frame 61, and so on are encapsulated with the molding resin 66 by means of a transfer-molding technology, while one end of the ferrule protrudes through the surface of the molding resin 66.

The optical device of the present invention differs from that of the seventh preferred embodiment only in that the encapsulating member 81 that encapsulates the recessed portion 71 is provided. If the recessed portion 71 is not encapsulated with the encapsulating member 81, a boundary surface of the underside 67a of the die pad 67 becomes delaminated from the molding resin 66 and subsequently moisture becomes penetrated into the inside of the boundary between the underside 67a of the die pad 67 and the molding resin 66. This may result in the formation of a crack as a result of sudden vaporization of water in the inside at the step of re-flow mounting of the optical device.

According to the eighth preferred embodiment, as described above, the encapsulating member 81 that encapsulates the recessed portion 71 is provided, so that water is rarely penetrated into the boundary between the underside 67a of the die pad 67 and the molding resin 66 and thus crack formation is minimized.

Accordingly, the eighth preferred embodiment produces the same effect as that of the seventh preferred embodiment.

Ninth Preferred Embodiment

In this embodiment, we will describe the process for manufacturing an optical device having a molded package structure in detail, where structural components including a lead frame and a ferrule are encapsulated with a molding resin by means of a transfer molding technique and one end of the ferrule is protruded from the surface of the molding resin to the outside.

In the present method, the steps prior to the step of placing a lead frame on a lower die are same as those of the first preferred embodiment.

Figure 21:
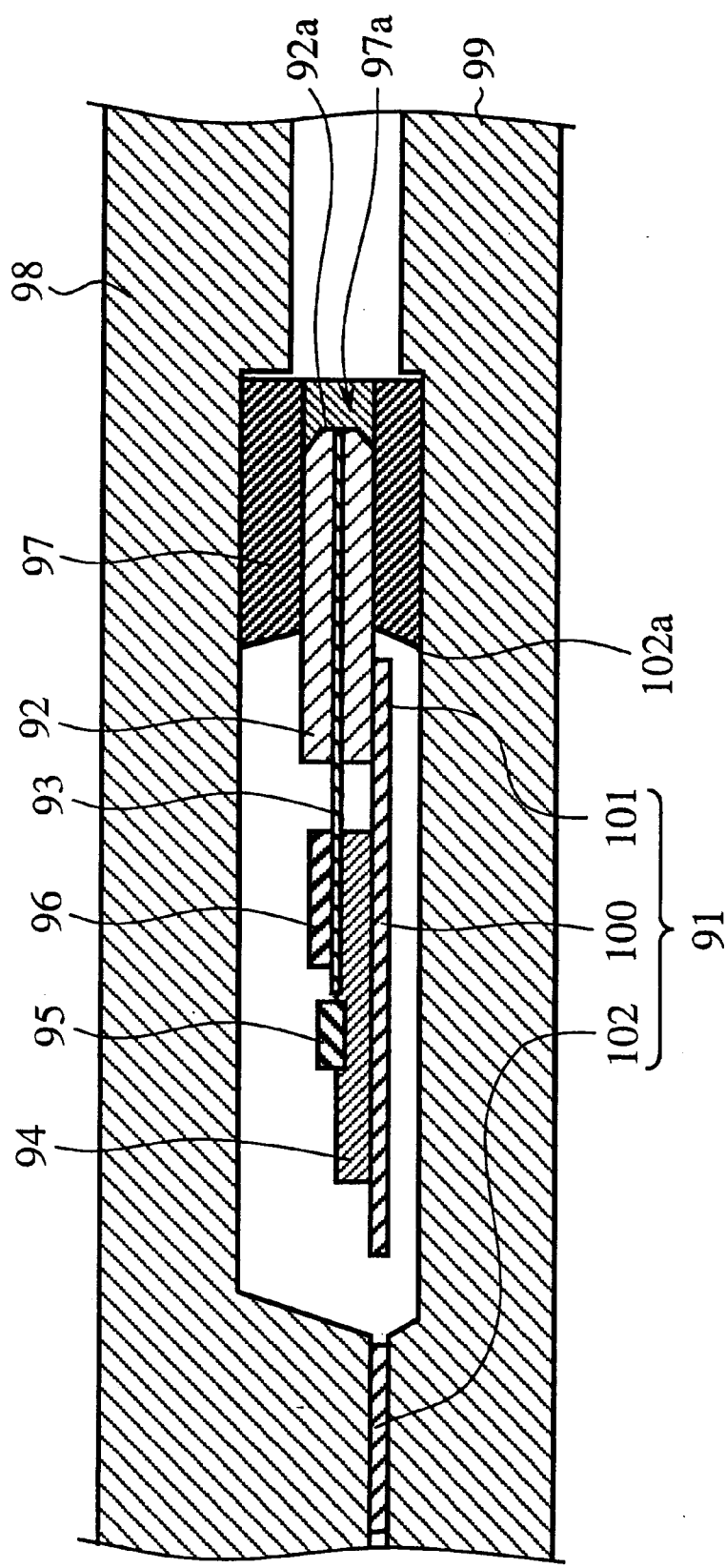
FIG. 21 is a side view of the configuration of a lead frame sandwiched between an upper die and a lower die for illustrating the process for manufacturing the optical device of the ninth preferred embodiment of the present invention.
Figure 22:
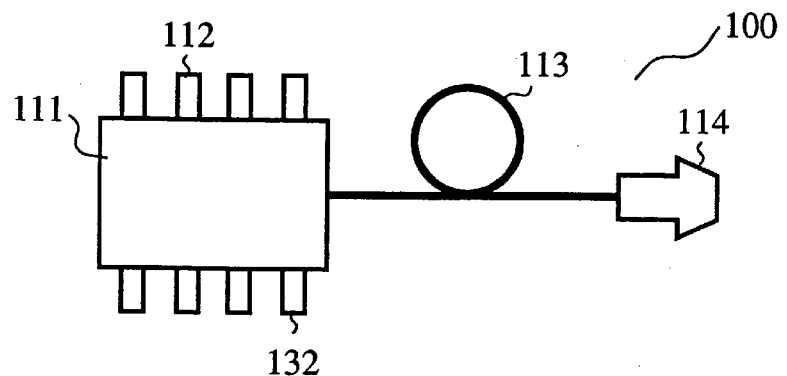
FIG. 22 is a top view of the conventional optical device having a ceramic package structure.
Figure 23:
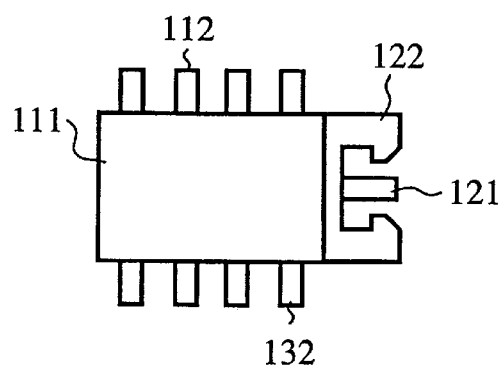
FIG. 23 is a top view of the conventional optical device having a ceramic package structure in which an optical fiber is placed in the predetermined position after the step of packaging.
Figure 24:
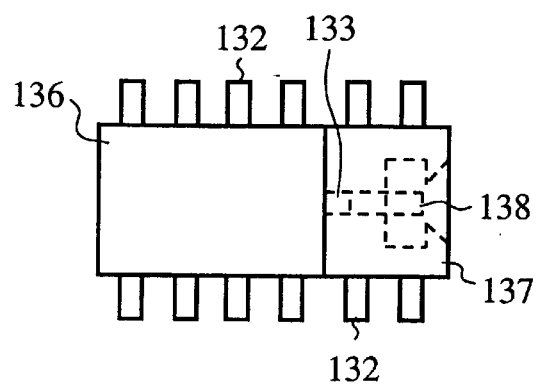
FIG. 24 is a top view of the conventional optical device having a molded package structure.
Figure 25:
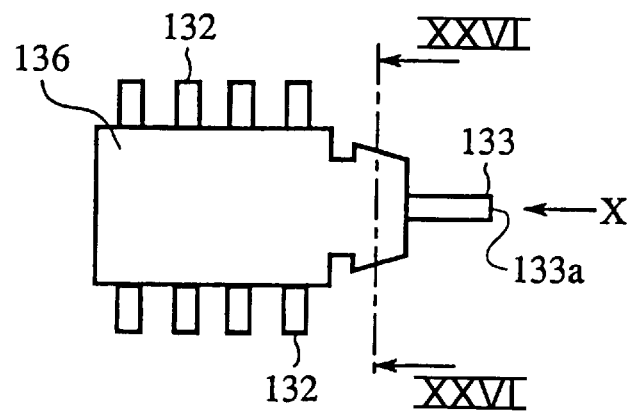
FIG. 25 is a top view of the conventional optical device shown in FIG. 24, from which a receptacle is removed.
Figure 26:
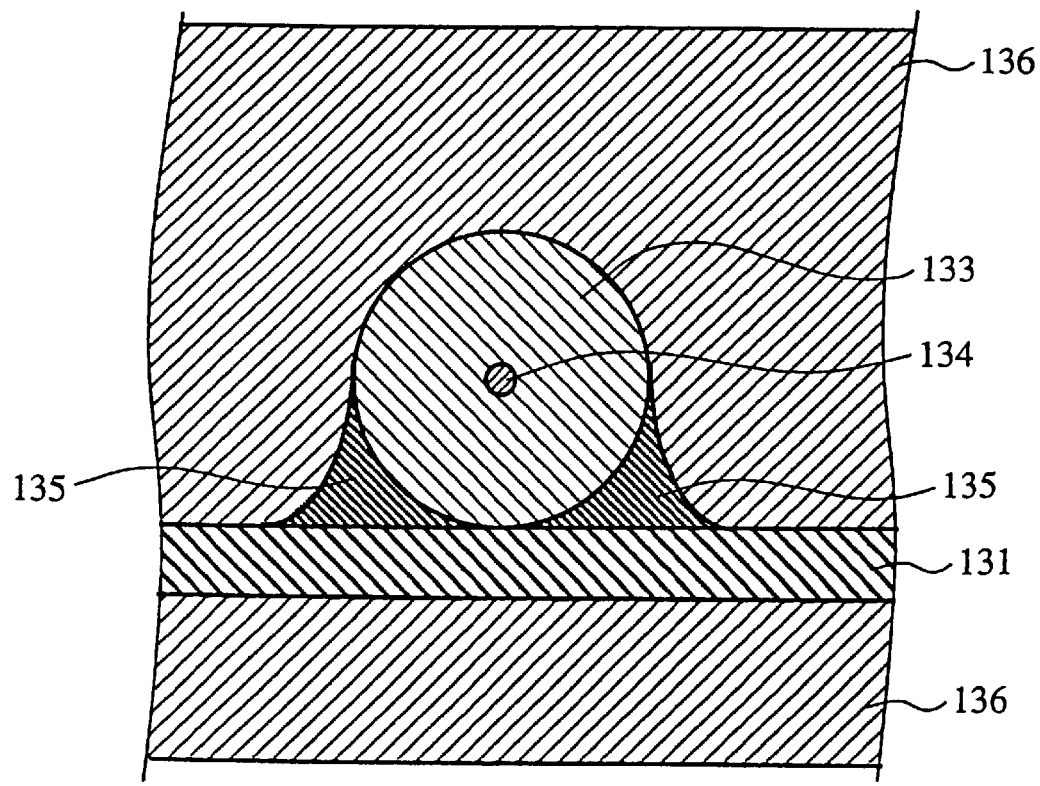
FIG. 26 is a cross sectional view of the conventional optical device along the line XXVI—XXVI in FIG. 25.
Figure 27:
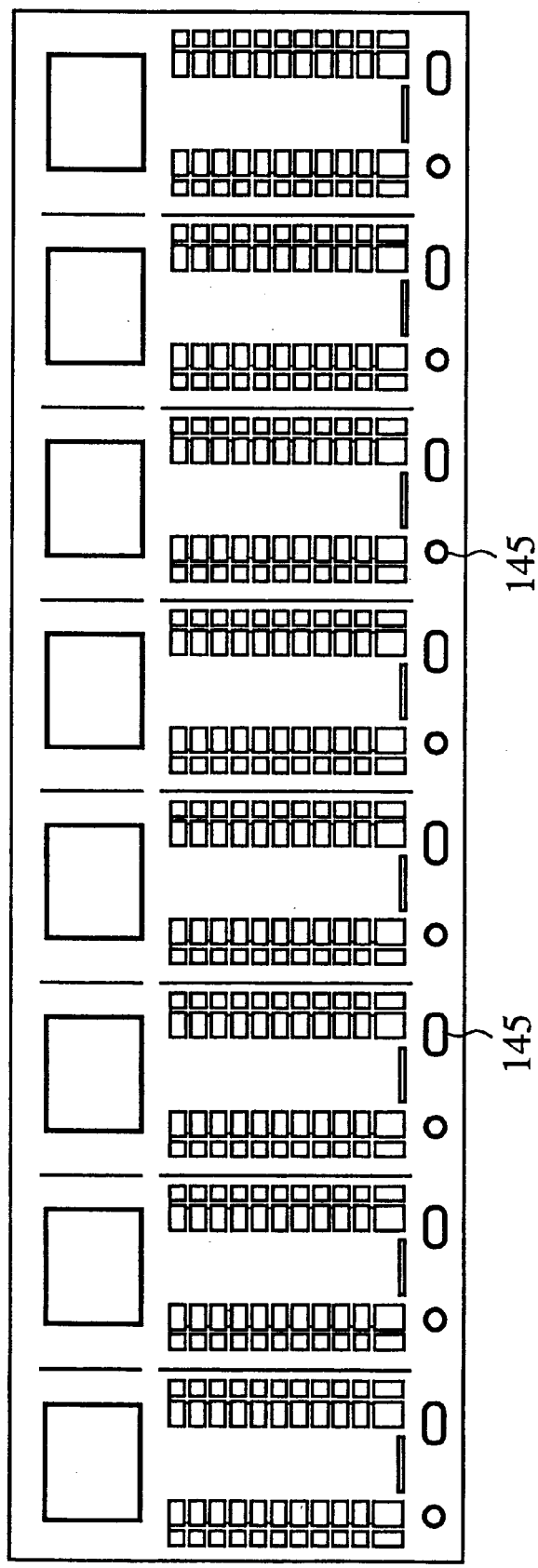
FIG. 27 is a plan view of a lead frame with a plurality of the same patterns connected to each other.
Figure 28:
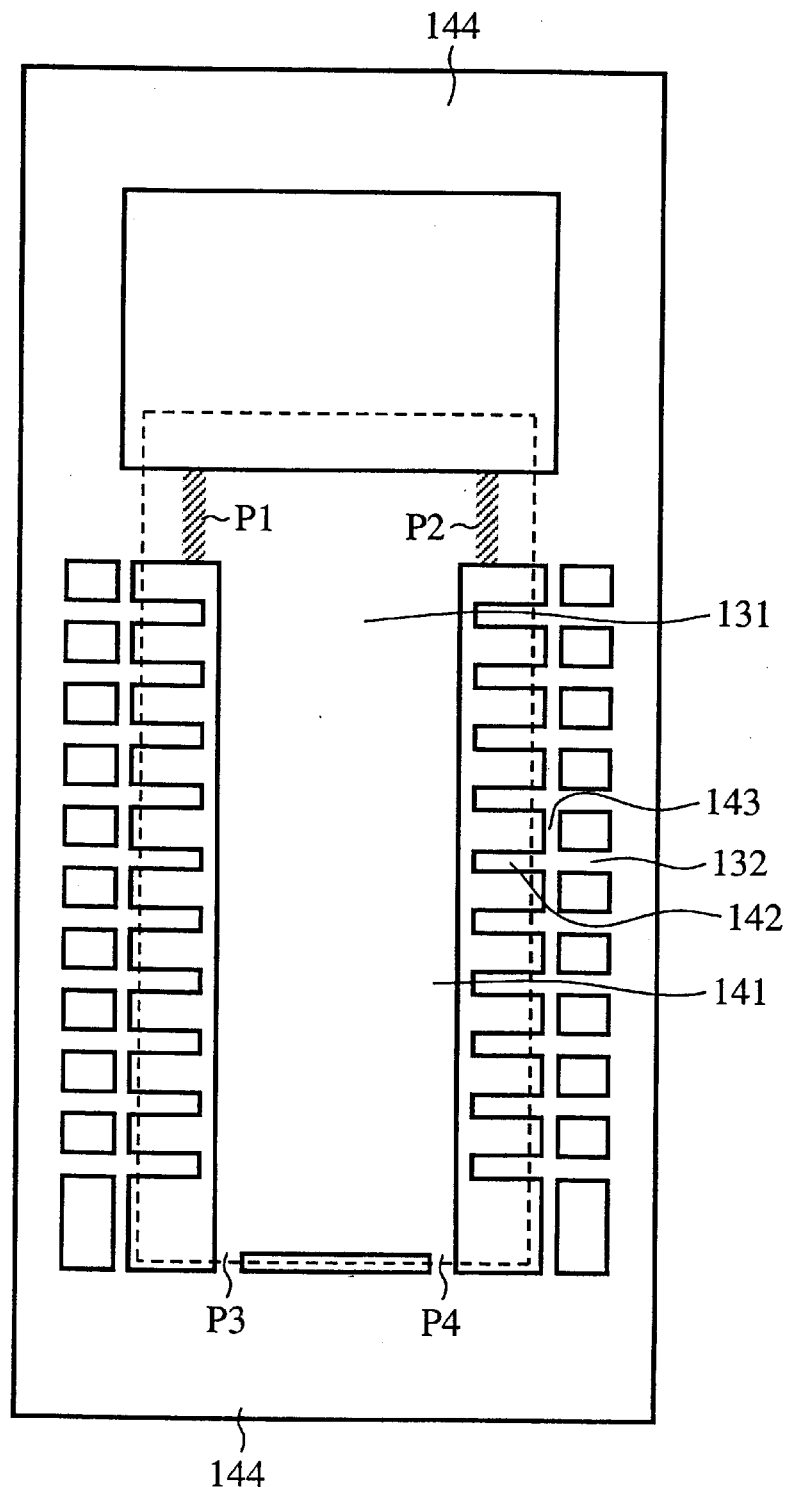
FIG. 28 is an enlarged view of one of the patterns in the lead frame shown in FIG. 27.

Following those steps, a block member having an opening for holding a ferrule mounted on a lead frame-mounting portion of a lead frame is attached to the ferrule from the one end's side of the ferrule. Subsequently, the lead frame is placed on the lower die and then an upper die is mated with the lower die to sandwich the lead frame between them. FIG. 21 is a cross sectional view of the configuration of a die assembly in which the lead frame is sandwiched between the upper die and the lower die. In the figure, the reference numeral 91 denotes a lead frame, 92 denotes a ferrule mounted on a ferrule-mounting portion 101 of a lead frame, 93 denotes an optical fiber having one end portion being placed in a V-shaped groove formed on the top of a silicon substrate 94 mounted on a die pad 100 of the lead frame, 95 denotes an optical fiber retainer for holding an optical fiber on the silicon substrate 94, 95 denotes an optical component such as LD or PD mounted on the silicon substrate 94, 97 denotes a block member having an opening 97a for holding a ferrule 92, 98 denotes an upper die, and 99 denotes a lower die. In the lead frame 91, the reference numeral 100 denotes a die pad, 101 denotes a ferrule-mounting portion, and 102 denotes an outer frame portion. One end portion of the ferrule 92 is inserted in the block member 97, while the outer flame portion 102 is sandwiched between the upper die 98 and the lower die 99. An end surface of the block member 97 on the side where the ferrule 92 is inserted is responsible for externally shaping the molding resin. A diameter of the ferrule-housing hole 97a of the block 97 is slightly larger than an external diameter of the ferrule 92, so that there is a gap between the ferrule 92 and the block member 97 is about 20 $\mu$m.

Subsequently, a molten molding resin is injected into to a cavity formed by mating the upper die with the lower die and then cured within a fixed time period. In this case, the molding resin does not enter the boundary between the block member and the die or the boundary between the ferrule and the block member. Then, the block member 97 is detached from the ferrule 92 and a predetermined portion of the lead frame is cut.

According to the ninth preferred embodiment, as described above, the block member having the hole for holding the ferrule is attached to one end portion of the ferrule. Subsequently, the lead frame where the ferrule mounted on the lead frame-mounting portion is attaching the block member is placed on the lower die and then the upper die is mated with the lower die to sandwich the lead frame between the dies. Therefore, any interaction between the ferrule and the die is substantially avoided, so that the present embodiment has the effect of remaining the ferrule intact.

According to the present invention, as described above, the optical device may be configured so that the ferrule lies in the first groove formed on the ferrule-mounting portion and parallel to the longitudinal direction of the ferrule to keep the ferrule in the right position. Therefore, the optical device of the present invention has the advantage that the ferrule remains intact because any interaction between the ferrule and the die can be substantially avoided.

According to the present invention, as described above, the optical device may be configured so that the second groove perpendicular to the first groove is formed on the ferrule-mounting portion and the filling member made of resin is provided in the gap between the ferrule and the ferrule-mounting portion. Therefore, the optical device of the present invention has the advantage that a higher adhesive strength between the ferrule and lead frame can be attained.

According to the present invention, as described above, the optical device may be configured so that the tip of the ferrule-mounting portion protrudes through the surface of the molding resin to the outside. Therefore, the optical device of the present invention has the advantage that the ferrule remains intact because any interaction between the ferrule and the die can be substantially avoided.

According to the present invention, as described above, the optical device may be configured so that the tip of the ferrule-mounting portion protrudes through the surface of the molding resin to the outside and the ferrule lies in the first groove formed on the ferrule-mounting portion and parallel to the longitudinal direction of the ferrule. Therefore, the optical device of the present invention has the advantage that the ferrule remains intact because any interaction between the ferrule and the die can be substantially avoided.

According to the present invention, as described above, the optical device may be configured so that the tip of the ferrule-mounting portion protrudes through the surface of the molding resin to the outside and the second groove perpendicular to the first groove is formed on the ferrule-mounting portion and the filing member made of resin is provided in the gap between the ferrule and the ferrule-mounting portion. Therefore, the optical device of the present invention has the advantage that there is little leakage of the molding resin.

According to the present invention, as described above, the optical device may be configured so that the ferrule-mounting member having a concave top surface is formed on the ferrule-mounting portion, and also the ferrule is positioned on the concave top surface of the ferrule-mounting member. Therefore, the optical device of the present invention has the advantage that a limit for the thickness of each component that constitutes the optical device can be relaxed.

According to the present invention, as described above, the optical device may be configured so that the die pad of the lead frame and the inner lead are in the same plane. Therefore, the optical device of the present invention has the advantage of eliminating the possibilities that the ferrule may be detached from the ferrule-mounting portion and also the optical fiber and the optical coupling among the optical components may be damaged.

According to the present invention, as described above, the optical device may be configured so that the recessed portion that extends from the underside of the molding resin to the underside of the die pad is formed by a die to be used at the step of molding. Therefore, the optical device of the present invention has the advantage of eliminating the possibilities that the ferrule may be detached from the ferrule-mounting portion and also the optical fiber and the optical coupling among the optical components may be damaged.

According to the present invention, as described above, the optical device may be configured so that recessed portion may be filled with the encapsulating member. Therefore, the optical device of the present invention has the advantage of moisture resistance, eliminating the possibilities of cracks to be caused by a moisture content at the step of re-flow mounting.

According to the present invention, as described above, the process for manufacturing the optical device may be comprised of the steps of positioning the lead frame on the lower die, and mating the upper die with the lower die to sandwich the lead frame between the dies, where the U-shaped recess for positioning the ferrule is formed on the die facing the ferrule-mounting side of the ferrule-mounting portion and the opposite side of the ferrule-mounting portion is formed as a flat surface. Therefore, the optical device of the present invention has the advantage that the ferrule remains intact because any interaction between the ferrule and the die can be substantially avoided.

According to the present invention, as described above, the process for manufacturing the optical device may be comprised of the steps of. attaching the block having a ferrule-housing hollow for housing the ferrule to the ferrule from one end of the ferrule; placing the lead frame on the under die, where the lead frame has the ferrule-mounting portion on which the ferrule attached to the block is mounted; and mating the upper die with the lower die to sandwich the lead frame between the dies. The optical device is configured so that an end surface of the block member on the side where the ferrule is inserted externally shapes the molding resin. Therefore, the optical device of the present invention has the advantage that the ferrule remains intact because any interaction between the ferrule and the die can be substantially avoided.

The present invention has been described in detail with respect to preferred embodiments, and it will now be obvious to those skilled in the art that changes and modifications may be made without departing from the invention in its broader aspects, and it is the intention, therefore, in the appended claims to cover all such changes and modifications as fall within the true spirit of the invention.

What is claimed is:

1. An optical device having a molded-package structure, comprising:
   a lead frame having a ferrule-mounting portion having a first groove with a longitudinal axis;
   a ferrule mounted directly on the ferrule-mounting portion, in the first groove, and aligned with the longitudinal axis; and
   a molding resin encapsulating the lead frame and the ferrule, applied in a transfer-molding technique, wherein an end of the ferrule protrudes through and outside of the molding resin.

2. The optical device as claimed in claim 1, including at least one second groove, perpendicular to the first groove, on the ferrule-mounting portion.

3. The optical device as claimed in claim 2, wherein the ferrule is aligned with the second groove.

4. The optical device as claimed in claim 1, including at least one second groove, perpendicular to the first groove, on the ferrule-mounting portion and a resin filler located in a gap between the ferrule and the ferrule-mounting portion.

5. An optical device having a molded-package structure, comprising:
   a lead frame having a ferrule-mounting portion having a first groove with a longitudinal axis;
   a ferrule mounted directly on the ferrule-mounting portion in the first groove aligned with the longitudinal axis; and
   a molding resin encapsulating the lead frame and the ferrule, applied in a transfer-molding technique, wherein an end of the ferrule protrudes through and outside of the molding resin and an end of the ferrule-mounting portion protrudes through and outside the surface of the molding resin.

6. The optical device as claimed in claim 5, including at least one second groove perpendicular to the first groove on the ferrule-mounting portion.

7. The optical device as claimed in claim 6, wherein the ferrule is aligned with the second groove.

8. The optical device as claimed in claim 5, including
   a first groove parallel to a longitudinal axis of the ferrule on the ferrule-mounting portion and wherein the ferrule is located on the first groove,
   at least one second groove perpendicular to the first groove on the ferrule-mounting portion, and
   a resin filler in a gap between the ferrule and the ferrule-mounting portion.

9. The optical device as claimed in claim 5, further comprising a ferrule-mounting member on the ferrule-mounting portion, wherein the ferrule-mounting member has a concave top surface on which the ferrule is disposed.

10. An optical device having a molded-package structure, comprising:
    a lead frame having a ferrule-mounting portion, a die pad, at least one inner lead, and at least one outer lead;
    a ferrule mounted directly on the ferrule-mounting portion; and a molding resin encapsulating the lead frame and the ferrule, applied in a transfer-molding, except that an end of the ferrule protrudes through and outside of the molding resin, wherein the die pad and the inner lead are co-planar.

11. The optical device as claimed in claim 10, further comprising a recessed portion that extends from an underside of the molding resin to an underside of the die pad, wherein the recessed portion is formed at the time of molding, using dies.

12. The optical device as claimed in claim 10, further comprising a recessed portion that extends from an underside of the molding resin to an underside of the die pad, wherein the recessed portion is formed at the time of molding, using dies, and is encapsulated by an encapsulating member.

13. The optical device as claimed in claim 10, wherein the ferrule-mounting portion has a first groove with a longitudinal axis, and the ferrule is mounted in the first groove and aligned with the longitudinal axis.

14. The optical device as claimed in claim 13, including at least one second groove, perpendicular to the first groove, on the ferrule-mounting portion.

15. The optical device as claimed in claim 14, wherein the ferrule is aligned with the second groove.

16. The optical device as claimed in claim 10, wherein the ferrule-mounting portion has a first groove with a longitudinal axis, the ferrule is mounted in the first groove and aligned with the longitudinal axis, and an end of the ferrule-mounting portion protrudes through and outside the surface of the molding resin.

* * * * *